(12) United States Patent
Inagaki et al.

(10) Patent No.: US 9,620,754 B2
(45) Date of Patent: Apr. 11, 2017

(54) POLYOLEFIN MICROPOROUS MEMBRANE AND SEPARATOR FOR LITHIUM ION SECONDARY BATTERY

(75) Inventors: Daisuke Inagaki, Tokyo (JP); Shinichi Iwakiri, Tokyo (JP); Shintarou Inaba, Tokyo (JP)

(73) Assignee: ASAHI KASEI E-MATERIALS CORPORATION, Tokyo (JP)

( * ) Notice: Subject to any disclaimer, the term of this patent is extended or adjusted under 35 U.S.C. 154(b) by 625 days.

(21) Appl. No.: 13/140,778

(22) PCT Filed: Dec. 21, 2009

(86) PCT No.: PCT/JP2009/007060
§ 371 (c)(1),
(2), (4) Date: Aug. 3, 2011

(87) PCT Pub. No.: WO2010/070930
PCT Pub. Date: Jun. 24, 2010

(65) Prior Publication Data
US 2011/0311878 A1    Dec. 22, 2011

(30) Foreign Application Priority Data
Dec. 19, 2008    (JP) .................. 2008-324259

(51) Int. Cl.
| H01M 10/0525 | (2010.01) |
| H01M 2/16 | (2006.01) |
| C08J 5/22 | (2006.01) |

(52) U.S. Cl.
CPC ......... *H01M 2/1653* (2013.01); *C08J 5/2231* (2013.01); *H01M 10/0525* (2013.01); *C08J 2323/02* (2013.01); *Y02E 60/122* (2013.01)

(58) Field of Classification Search
CPC .... H01M 2/1653; Y02E 60/122; C08J 5/2231
USPC ..... 429/247–249, 251, 231.95; 442/170–171
See application file for complete search history.

(56) References Cited

U.S. PATENT DOCUMENTS

| 4,839,408 | A * | 6/1989 | Fukui et al. .................. 524/100 |
| 4,912,156 | A | 3/1990 | Yagi et al. |
| 6,245,272 | B1 * | 6/2001 | Takita et al. ............... 264/210.4 |
| 6,566,012 | B1 * | 5/2003 | Takita ................. H01M 2/1653 210/500.42 |
| 7,902,325 | B2 * | 3/2011 | Blackmon et al. ........... 528/498 |
| 2001/0038942 | A1 | 11/2001 | Fisher et al. |
| 2006/0008636 | A1 | 1/2006 | Lee et al. |
| 2006/0141351 | A1 * | 6/2006 | Suh ....................... H01M 2/145 429/144 |
| 2007/0281206 | A1 | 12/2007 | Fujikawa et al. |
| 2009/0004570 | A1 | 1/2009 | Inoue |
| 2009/0130974 | A1 | 5/2009 | Yoneda |
| 2009/0253032 | A1 | 10/2009 | Takita et al. |
| 2010/0159334 | A1 | 6/2010 | Kashima et al. |
| 2011/0039145 | A1 | 2/2011 | Abe et al. |
| 2011/0269900 | A1 | 11/2011 | Tamura et al. |

FOREIGN PATENT DOCUMENTS

| JP | S64-36634 | 2/1989 |
| JP | 6-96753 | 4/1994 |
| JP | 2000-030683 | 1/2000 |
| JP | 2002-025531 | 1/2002 |
| JP | 2002-128942 A | 5/2002 |
| JP | 2003-137929 | 5/2003 |
| JP | 2005-320364 | 11/2005 |
| JP | 2006-083253 | 3/2006 |
| JP | 2006-093688 | 4/2006 |
| JP | 2006-143975 | 6/2006 |
| JP | 2006-307163 | 11/2006 |
| JP | 2007-157458 A | 6/2007 |
| JP | 2007-246658 | 9/2007 |
| JP | 2007-324073 A | 12/2007 |
| JP | 2008-506003 A | 2/2008 |
| JP | 2008-055901 | 3/2008 |
| JP | 2008-59758 A | 3/2008 |
| JP | 2008-81513 A | 4/2008 |
| JP | 2008-106237 A | 5/2008 |
| JP | 2008-248231 A | 10/2008 |
| JP | 2008-255307 | 10/2008 |
| JP | 2009-032677 A | 2/2009 |
| JP | 2009-128942 | 6/2009 |
| JP | 2009-231281 A | 10/2009 |
| JP | 2011-074119 A | 4/2011 |
| WO | WO 2007/098339 A2 | 8/2007 |

(Continued)

OTHER PUBLICATIONS

International Search Report issued in International application No. PCT/JP2009/007060.
International Preliminary Report on Patentability issued in International application No. PCT/JP2009/007060.
Notice of Information Submission of Third Party Observation for Japanese Application No. 2011-162128 mailed Oct. 24, 2013.
Third Party Submission dated May 17, 2013 to Japanese Application No. 2011-162128.
Third Party Submission dated May 14, 2013 to Japanese Application No. 2011-162128.
Akihiko Yamamoto et al., "Development of Polyethylene for Container for High Purity Chemical", Yokkaichi Research Laboratory, P.O. Divisional, TOSOH Research and Technology Review, vol. 45 (2001).
Japanese Patent Office, "Official Communication," issued Feb. 28, 2014 in JP-2011-162128, 3 pages.

(Continued)

*Primary Examiner* — Ula C Ruddock
*Assistant Examiner* — Thomas Parsons
(74) *Attorney, Agent, or Firm* — Finnegan, Henderson, Farabow, Garrett & Dunner, LLP

(57) ABSTRACT

A polyolefin microporous membrane that can realize a lithium ion secondary battery having favorable resistance against foreign matters or the like, and high cycle characteristics at a high temperature is provided. The present invention provides a polyolefin microporous membrane having a ratio of tensile strength in a length direction to that in a width direction of 0.75 to 1.25, and a thermal shrinkage rate in the width direction at 120° C. of less than 10%.

6 Claims, No Drawings

(56) References Cited

FOREIGN PATENT DOCUMENTS

| WO | WO 2007/117005 A1 | 10/2007 |
| WO | WO 2009/011249 A1 | 1/2009 |
| WO | WO 2010/079799 A1 | 7/2010 |

OTHER PUBLICATIONS

Office Action for Chinese Application No. 201310221747.5 issued on Apr. 25, 2014.
Practical Dictionary of Catalysts, Published by Shigeki Shintani, Kogyo Chosakai Publishing Co., Ltd., pp. 598-617 (1984).

* cited by examiner

POLYOLEFIN MICROPOROUS MEMBRANE AND SEPARATOR FOR LITHIUM ION SECONDARY BATTERY

TECHNICAL FIELD

The present invention relates to a polyolefin microporous membrane, a separator for a lithium ion secondary battery, and a lithium ion secondary battery.

BACKGROUND ART

Polyolefin microporous membranes made of polyolefin are widely used as separation membranes, permselective separation membranes, separator materials, and the like for various types of substances. Examples of applications thereof include microfiltration membranes, separators for fuel cells, separator for capacitors, base materials for functional membranes of which pores are filled with functional materials for development of new functions, and separators for batteries. Particularly, polyolefin microporous membranes are suitably used as separators for lithium ion batteries broadly provided for mobile apparatuses such as laptop personal computers, cellular phones, digital cameras, and the like. One of its reasons is that the polyolefin microporous membranes have high mechanical strength and insulation performance.

Here, there is a demand of cylindrical lithium ion secondary batteries provided in laptop personal computers, electric tools, and the like that the lithium ion secondary battery can be accommodated in a limited space and has high capacity. Conventionally, in the lithium ion secondary batteries, the electrode, the electrolytic solution, and the polyolefin microporous membrane as a separator each have been improved from such a viewpoint. The "high capacity" used in the specification means capacity of not less than 2400 mAh in an ordinary cylindrical secondary battery having an outer diameter of 18 mm and a height of 65 mm, for example. In a battery having other shape and size, it means that the capacity per volume is not less than 145 mAh/cm$^3$.

Patent Document 1 proposes a microporous membrane including a thermally stable polymer and a ceramic filler in one side of a polymer microporous membrane, and a cylindrical lithium ion secondary battery including the microporous membrane and having an outer diameter of 18 mm, a height of 65 mm, and a capacity of 2500 mAh.

Patent Document 2 proposes a cylindrical lithium ion secondary battery having the same size and a capacity of 2500 to 2840 mAh.

Patent Document 3 discloses a microporous membrane composed of a polyethylene composition containing high density polyethylene in which the amount of catalyst residues is 300 ppm. Patent Document 4 discloses a polyolefin microporous membrane having high quality. Moreover, Patent Document 5 discloses a polyolefin microporous membrane using polyethylene whose molecular weight is not more than 500,000.

Patent Document 1: Japanese Patent Application Laid-Open No. 2007-324073
Patent Document 2: Japanese Patent Application Laid-Open No. 2007-157458
Patent Document 3: Japanese Patent Application Laid-Open No. 2002-128942
Patent Document 4: Published Japanese Translation of PCT International Publication for Patent Application No. 2008-506003
Patent Document 5: Japanese Patent Application Laid-Open No. 6-96753

SUMMARY OF THE INVENTION

Problems to be Solved by the Invention

In recent years, however, as the capacity is higher in the cylindrical battery, difficulties have been exponentially increased in that a safety test result approximately equal to that in the conventional battery is obtained. For example, in the case where foreign matters produced by slipping off of an electrode active material are wrapped in during rolling a battery at the time of producing a high capacity battery, a possibility that the electrode active material penetrates a separator to cause short circuit is increased because the separator is formed so as to be thinner as the capacity is higher. Additionally, the high capacity battery also tends to have larger Joule heat produced in the case of short, so that stability of the battery may be reduced.

Moreover, with respect to cycle characteristics at a relatively high temperature, the capacity of the battery may be remarkably reduced, leading to inferior cycle characteristics for the reasons such that the expansion and shrinkage ratio of the electrode is higher than that in the conventional battery, an inside of the battery generates heat at a temperature of not less than a preset temperature and the separator easily shrinks, and the like.

While the microporous membrane described in Patent Document 1 includes a high heat-resistant porous layer to enhance safety, the microporous membrane is still susceptible to improvement with respect to prevention of internal short circuit and improvement in the cycle characteristics at a high temperature of the battery.

It is shown that the microporous membrane described in Patent Document 2 has a laminating structure as a preferable aspect, and the porosity size and a preferable range of porosity are specified. However, in the case where application of such a microporous membrane to high capacity lithium ion secondary batteries is considered, particularly resistance against foreign matters or the like is not examined, and thus the membrane is still susceptible to improvement.

Further, in all the microporous membranes described in above Patent Documents 3 to 5 in use for a separator for lithium ion secondary batteries, considerations for impurities particularly needed in recent years are not made, or insufficient if made. Accordingly, these membranes are still susceptible to improvement.

The present invention has been made in consideration of the above-mentioned circumstances. An object of the present invention is to provide a polyolefin microporous membrane that can realize a lithium ion secondary battery having favorable resistance against foreign matters and the like, and having cycle characteristics at a high temperature, a separator for a lithium ion secondary battery, and a lithium ion secondary battery.

Other object of the present invention is to provide a polyolefin microporous membrane separator for a lithium ion secondary battery including less foreign matters in the membrane, having high quality, and showing favorable cycle characteristics when the polyolefin microporous membrane is used as a separator for a nonaqueous electrolyte type secondary battery, and a lithium ion secondary battery.

Means for Solving the Problems

As a result of repeated and extensive research in order to achieve the above-mentioned object, the present inventors found out that in a battery having particularly high capacity not less than a predetermined capacity, dependence on a separator with respect to safety and cycle characteristics is increased drastically. Then, the present inventors found out that a polyolefin microporous membrane having specific membrane physical properties can solve the above problem, and have completed the present invention.

As a result of repeated and extensive research in order to achieve the above-mentioned other object, the present inventors found out that a polyolefin microporous membrane formed using polyolefin in which the content of aluminum is adjusted to not more than a specific amount can achieve the other object, and have completed the present invention.

Namely, the present invention is as follows.

[1] A polyolefin microporous membrane having a ratio of tensile strength in a length direction to tensile strength in a width direction of 0.75 to 1.25, and a thermal shrinkage rate in the width direction at 120° C. of less than 10%.

[2] The polyolefin microporous membrane according to [1], wherein the polyolefin microporous membrane has the ration of tensile strength of 0.85 to 1.25.

[3] The polyolefin microporous membrane according to any one of [1] or [2], wherein the polyolefin microporous membrane has the tensile strength in the width direction of not less than 160 MPa.

[4] The polyolefin microporous membrane according to any one of [1] to [3], wherein the polyolefin microporous membrane has a tensile strength of not less than 160 MPa and not more than 250 MPa.

[5] The polyolefin microporous membrane according to any one of [1] to [4], wherein the polyolefin microporous membrane has a content of aluminum of not more than 10 ppm.

[6] A polyolefin microporous membrane, wherein the polyolefin microporous membrane has a content of aluminum of not more than 70 ppm.

[7] The polyolefin microporous membrane according to [6], wherein the polyolefin microporous membrane has a total content of calcium, magnesium, zinc, and barium of not more than 300 ppm.

[8] The polyolefin microporous membrane according to [6] or [7], comprising polyolefin having a weight average molecular weight of not more than 500,000.

[9] A separator for a lithium ion secondary battery, comprising the polyolefin microporous membrane according to any one of [1] to [8].

[10] A lithium ion secondary battery comprising the separator for a lithium ion secondary battery according to [9], a positive electrode, a negative electrode, and an electrolytic solution.

Effect of the Invention

According to the present invention, it is possible to provide a polyolefin microporous membrane that can realize a lithium ion secondary battery having favorable resistance against foreign matters and the like, and high cycle characteristics at a high temperature, a separator for a lithium ion secondary battery, and a lithium ion secondary battery.

According to the present invention, it is also possible to provide a polyolefin microporous membrane separator for a lithium ion secondary battery including less foreign matters in the membrane, having high quality, and showing favorable cycle characteristics when the polyolefin microporous membrane is used as a separator for a nonaqueous electrolyte type secondary battery, and a lithium ion secondary battery.

MODE FOR CARRYING OUT THE INVENTION

Hereinafter, the mode for carrying out the present invention (hereinafter, abbreviated to "the present embodiment") will be described in detail. Here, the present invention is not limited to the following embodiments, and can be carried out within the scope thereof by making various changes and modifications.

A separator for a lithium ion secondary battery according to the present embodiment includes a polyolefin microporous membrane (hereinafter, simply abbreviated to a "PO microporous membrane" in some cases), and is preferably composed of a PO microporous membrane. The microporous membrane has communicating pores in the thickness direction thereof, and has a three-dimensional net-like skeleton structure, for example. The microporous membrane has a ratio of tensile strength in the width direction (a direction transverse to a longitudinal direction; hereinafter, abbreviated to the "TD" in some cases) to that in the longitudinal direction (synonymous with a raw resin discharging direction and a machine direction; hereinafter, abbreviated to the "MD" in some cases), i.e., an MD/TD tensile strength ratio of 0.75 to 1.25, and the thermal shrinkage rate in the TD at 120° C. of less than 10%.

The separator according to the present embodiment has such a constitution, so that the separator can realize favorable resistance characteristics against foreign matters and cycle characteristics at a high temperature particularly demanded of high capacity lithium ion secondary batteries. Although the detail of the reason is not clear, it can be thought as follows. First, it is thought that in the case where the foreign matters exist within the battery, an MD/TD tensile strength ratio of 0.75 to 1.25, preferably 0.80 to 1.25, and more preferably 0.85 to 1.25 contributes to development of extremely high resistance against foreign matters because of the higher isotropy than a membrane having an MD/TD tensile strength ratio outside the above-mentioned range even if puncture strength in the thickness direction is the same. In other words, it is thought that the MD/TD tensile strength ratio in the above-mentioned range provides the most favorable strength balance for the foreign matters having a variety of shapes under an environment within an actual battery where the shapes of the foreign matters are not uniform. From the same viewpoint, the upper limit of the MD/TD tensile strength ratio is preferably 1.20, and more preferably 1.10.

Additionally, it is presumed that at such a tensile strength ratio, and at a thermal shrinkage rate in the TD at 120° C. of the PO microporous membrane of less than 10%, preferably less than 8%, and more preferably less than 6%, the deformation direction under a hot environment of the separator within the battery rolled in a state where tension is applied in the MD is restricted, and as a result, reduction in the porosity of the membrane due to shrinkage is favorably suppressed, and reduction in the cycle characteristics is suppressed. Further, it is thought that when micro internal short circuit due to foreign matters is produced, expansion of a hole in the separator can also be minimized, the rate of generation of heat may be delayed, and as a result, a surprising effect of increasing external pressure necessary for ignition due to short also develops. Moreover, the lower limit of the thermal shrinkage rate in the TD at 120° C. is not particularly limited. For example, a lower limit of the thermal shrinkage rate in the TD not less than 0.1% is preferable because the above-mentioned effects according to the present invention can be obtained more effectively and securely. The PO microporous membrane may expand in the TD in the range of not more than 1%.

Further, a thermal shrinkage rate in the TD at 105° C. of the PO microporous membrane of less than 3%, preferably less than 1%, and more preferably less than 0.5% is preferable for the same reason that the TD thermal shrinkage rate at 120° C. is within the above-mentioned range. The PO microporous membrane may also expand at 105° C. in the TD in the range of not more than 1%.

The tensile strength in the TD of the above PO microporous membrane is preferably not less than 160 MPa, and more preferably not less than 170 MPa. Because the separator contacts edge parts of positive and negative electrodes parallel to the MD of the PO microporous membrane, it is thought that the separator is easily pulled in the TD. It is also thought that substances slipping off from the electrode edge part highly probably exist in a state where the slipping off substances are longer in the MD than the TD of the PO microporous membrane. It is thought that the separator is easily pulled in the TD also by contact with the slipping off substances. Although the reason is not clear, the MD/TD tensile strength ratio and the tensile strength in the TD set in the above ranges can act for further improvement in resistance against the electrode edge part and resistance against the slipping off substances. While the upper limit of the tensile strength is not particularly limited, 500 MPa is preferable, 300 MPa is more preferable, and 250 MPa is still more preferable for a balance between the tensile strength and the shrinkage ratio.

From the viewpoint of further improving the cycle properties at a high temperature, the porosity of the PO microporous membrane is preferably not less than 30%, more preferably not less than 35%, and still more preferably not less than 40%. From the viewpoint of keeping membrane strength and suppressing self-discharge, the porosity thereof is preferably not more than 90%, more preferably not more than 80%, and still more preferably not more than 50%.

From the viewpoint of further improving the cycle properties at a high temperature, the air permeability of the PO microporous membrane is preferably not less than 30 seconds, more preferably not less than 50 seconds, and still more preferably not less than 80 seconds. From the viewpoint of keeping membrane strength and suppressing self-discharge, the air permeability thereof is preferably not more than 600 seconds, more preferably not more than 500 seconds, and still more preferably not more than 400 seconds.

The puncture strength (absolute strength) of the PO microporous membrane is preferably not less than 3 N, and more preferably not less than 4 N. In the case where the separator for batteries includes the PO microporous membrane, a puncture strength of not less than 3 N is preferable from the viewpoint of being capable of reducing production of a pinhole and a crack when a sharp portion of an electrode material or the like pierces in the PO microporous membrane. The upper limit of the puncture strength is preferably 10 N, and more preferably 8 N.

While the membrane thickness of the PO microporous membrane is not particularly limited, the membrane thickness is preferably not less than 1 μm from the viewpoint of membrane strength, and preferably not more than 30 μm from the viewpoint of battery capacity. From the viewpoint of use for a cylindrical high capacity battery in recent years that requires higher capacity than conventionally, the membrane thickness thereof is preferably less than 20 μm, and particularly preferably not more than 18 μm.

A PO microporous membrane whose various characteristics fall within the above numerical value ranges is formed using a method for adjusting a concentration and stretch ratio of a polymer at the time of extrusion, stretching and relaxation operation after extraction, heat treatment of a master roll, and raw materials to be blended.

In the present embodiment, the PO microporous membrane may be not only a single layer body composed of a microporous membrane made of polyolefin, but also a laminated body. Examples of a specific aspect of the laminated body include a laminated body of microporous membranes made of polyolefin, a laminated body of a microporous membrane made of polyolefin and a nonwoven fabric or other microporous membrane, or those obtained by applying an inorganic component and an organic component to the surface of a microporous membrane made of polyolefin. The shape of the laminated body is not limited if the respective characteristics are within the above numerical value ranges.

Next, a method for producing a PO microporous membrane will be described. If a microporous membrane to be obtained satisfies requirements on the respective characteristics, there are no limitations in types of polymer, types of solvent, extrusion methods, stretching methods, extraction methods, pore-forming methods, heat setting and heat treatment methods, and the like.

More specifically, examples of a method for producing a PO microporous membrane include a method comprising the respective steps (a) to (f) below:

(a) a kneading step of kneading a polyolefin, a plasticizer, and an inorganic material when necessary;
(b) an extrusion step of extruding the kneaded product through the kneading step;
(c) a sheet forming step of forming the extruded product through the extrusion step into a sheet form (irrespective of a single layer or a laminated layer), and cooling and solidifying the molded product;
(d) a stretching step of stretching the sheet-like formed product through the sheet forming step in the uni- or multi-axial directions;
(e) an extracting step of extracting the plasticizer and the inorganic material when necessary from the stretched film obtained through the stretching step; and
(f) a post-processing step of heating to heat-set the stretched film through the extracting step.

Hereinafter, each step will be described.

Examples of the polyolefin used in the kneading step (a) include homopolymers of ethylene or propylene, and copolymers obtained by polymerizing at least two or more monomers selected from the group consisting of ethylene, propylene, 1-butene, 4-methyl-1-pentene, 1-hexene, 1-octene, and norbornene.

These polyolefins are not particularly limited, and examples thereof include polyethylenes produced using an organoaluminum compound as a promoter. Such polyethylenes can be produced using a Ziegler-Natta catalyst, a metallocene catalyst, and the like in which an organoaluminum compound is used as a promoter. Moreover, other than the polyethylenes produced using an organoaluminum compound as a promoter, polyethylenes produced using a chromium catalyst and low density polyethylenes obtained by using a peroxide as a catalyst can also be used as the above polyolefin, for example. Examples of other polyolefins include polypropylenes, methylpentene copolymers, and cyclic olefin copolymers such as ethylene tetracyclododecene copolymers and ethylene norbornene copolymers. From the viewpoint of mechanical strength and stretchability at the time of production of the membrane, the polyolefin preferably contains not less than 30% by mass of polyethylene produced using an organoaluminum compound as a promoter.

These polyolefins are used alone or as a mixture of two or more thereof. Use of the mixture is preferable because control of a fuse temperature and short temperature of the separator is easy. Particularly, a mixture prepared by mixing an ultrahigh molecular weight polyolefin having a viscosity average molecular weight (hereinafter, abbreviated to "Mv" in some cases) of not less than 500,000 with a polyolefin having an Mv of less than 500,000, for example, is more preferable for the proper molecular weight distribution from the viewpoint of easiness to give isotropy to strength of the separator. Herein, the Mv is measured in accordance with ASTM-D4020.

The polyethylene to be mixed is preferably a high density homopolymer from the viewpoint of reduction in the thermal shrinkage rate because clogging of pores of the PO microporous membrane can be suppressed while heat setting at a higher temperature can be performed. The Mv of the entire PO microporous membrane is preferably 100,000 to 1,200,000, and more preferably 300,000 to 800,000. An Mv of not less than 100,000 is preferable because membrane breaking resistance at the time of generation of heat by short attributed to foreign matters or the like is likely to develop. An Mv of not more than 1,200,000 is preferable because orientation in the MD at the extruding step is suppressed and isotropy is likely to develop.

Preferably, a polypropylene, particularly several kinds of polypropylene having a different Mv from each other are further mixed with the mixture of the above-mentioned polyethylene. Thereby, although the reason is not certain, a characteristic of the stretched membrane through the stretching step tending to be oriented in the MD is suppressed, and as a result, isotropic characteristics are easily obtained. Further, mixing of the polypropylene is preferable because when the heat is generated locally by short in the battery, an endothermic action within the battery by fusion of the polypropylene occurs in the vicinity of 160° C., which is the melting point of the polypropylene, and safety tends to be increased.

The amount of the polypropylene to be mixed based on the entire polyolefin used at the kneading step (a) is preferably 1 to 80% by mass, more preferably 2 to 50% by mass, particularly preferably 3 to 20% by mass, and most preferably 5 to 10% by mass. If an amount of the polypropylene to be mixed is not less than 1% by mass, the above effect by mixing easily develops. If an amount of the polypropylene to be blended is not more than 80% by mass, permeability is easily ensured.

The proportion of the polyolefin to be blended is preferably 1 to 60% by mass, and more preferably 10 to 40% by mass based on the total mass of the polyolefin, the plasticizer, and an inorganic material blended when necessary.

Known additives such as a metallic soap such as magnesium stearate, calcium stearate, and zinc stearate, an ultraviolet absorbing agent, a light stabilizer, an antistatic agent, an anti-fogging agent, and a color pigment may be mixed with the polyolefin used at the kneading step (a).

Examples of the plasticizer include an organic compound that can form a uniform solution with a polyolefin at a temperature not more than the boiling point thereof. Specifically, examples of the plasticizer include decalin, xylene, dioctyl phthalate, dibutyl phthalate, stearyl alcohol, oleyl alcohol, decyl alcohol, nonyl alcohol, diphenyl ether, n-decane, n-dodecane, and paraffin oil (liquid paraffin). Among them, paraffin oil and dioctyl phthalate are preferable.

The proportion of the plasticizer to be blended is not particularly limited, and is preferably not less than 20% by mass from the viewpoint of the porosity of the PO microporous membrane to be obtained, and preferably not more than 90% by mass from the viewpoint of the viscosity based on the total mass of the polyolefin, the plasticizer, and an inorganic material blended when necessary. From the viewpoint of easiness to reduce MD orientation after extrusion from an extruder, the proportion thereof is preferably 50 to 80% by mass, and more preferably 60 to 75% by mass.

Examples of the inorganic material include oxide ceramics such as alumina, silica (silicon oxide), titania, zirconia, magnesia, ceria, yttria, zinc oxide, and iron oxide; nitride ceramics such as silicon nitride, titanium nitride, and boron nitride; ceramics such as silicon carbide, calcium carbonate, aluminum sulfate, magnesium sulfate, aluminum hydroxide, potassium titanate, talc, kaolin clay, kaolinite, halloysite, pyrophyllite, montmorillonite, sericite, mica, amesite, bentonite, asbestos, zeolite, calcium silicate, magnesium silicate, diatomaceous earth, and quartz sand; and glass fibers. These are used alone, or two or more thereof are used in combination. Among these, silica, alumina, and titania are preferable from the viewpoint of electrochemical stability. These can be added to the polyolefin composition within the range in which the effect of the present invention is not impaired.

The proportion of the inorganic material to be blended is preferably not less than 5% by mass, more preferably not less than 10% by mass based on the total mass of the polyolefin and the inorganic material from the viewpoint of obtaining favorable isolation properties. The proportion is preferably not more than 99% by mass, and more preferably not more than 95% by mass based on the total mass of the polyolefin and the inorganic material from the viewpoint of ensuring high strength.

On the other hand, the content of aluminum contained in the PO microporous membrane is preferably not more than 10 ppm, more preferably not more than 5 ppm, still more preferably not more than 3 ppm, and particularly preferably not more than 1 ppm. A content of aluminum of not more than 10 ppm tends to improve resistance against foreign matters or provide favorable capacity retention at a high temperature in the case where the PO microporous membrane according to the present embodiment is used as the separator for batteries. Although this reason is not certain, it is presumed that if a large amount of aluminum remains in the raw material at the time of producing the PO microporous membrane, a gel on the basis of aluminum is produced to reduce resistance against pressure from the outside. Moreover, aluminum existing in the PO microporous membrane as the separator for batteries may react with an electrolyte particularly at a high temperature, and may reduce the capacity retention. On the other hand, the lower limit of the content of aluminum in the PO microporous membrane is not particularly limited. Preferably, the content of aluminum is not less than 0.1 ppm from the viewpoint of adsorbing hydrogen fluoride, which is derived from decomposition of an electrolyte and gives an adverse influence on a cell reaction.

Examples of a method for adjusting the content of aluminum to not more than 10 ppm include a variety of methods because the shape and source of aluminum to be mixed are various. Reduction in the concentration of organoaluminum in a polymerization process of polyolefin and washing of a polyolefin raw material or the PO microporous membrane by an acid or an alkali are preferable.

As a kneading method at the kneading step (a), for example, first, the raw materials are partially or entirely mixed in advance using a Henschel mixer, a ribbon blender, a tumbler blender, or the like when necessary. Next, all the raw materials are molten and kneaded by a screw extruder such as a single screw extruder and a twin screw extruder, a kneader, a mixer, or the like.

On kneading, preferably, after an antioxidant is mixed at a predetermined concentration with the raw material polyolefin, an atmosphere around the mixture is replaced by a nitrogen atmosphere, and the melting and kneading is performed with the nitrogen atmosphere being maintained. The temperature at the time of melting and kneading is preferably not less than 160° C., and more preferably not less than 180° C. The temperature is preferably less than 300° C. Although a preferable range of the temperature varies according to the composition of the raw materials and the concentration of the polyolefin, the temperature at the time of melting and kneading are preferably under conditions such that MD orientation of the PO microporous membrane is reduced. For example, in the case where the Mv of the raw material polyolefin is large, MD orientation is preferably suppressed by melting and kneading at a high temperature of approximately 250° C.0

At the extruding step (b), the kneaded product through the above kneading step is extruded by an extruder having a T-shaped die, a cyclic die, or the like. At this time, the kneaded product may be extruded as a single layer or a laminated layer. The conditions on extrusion may be the same as conventional.

Next, at the sheet forming step (c), the extruded product obtained through the respective steps (a) and (b) is formed into a sheet form, and cooled and solidified. The sheet-like formed product obtained by sheet forming may be a single layer or a laminated layer. Examples of a method for forming a sheet include a method for solidifying an extruded product by compression cooling. Examples of a cooling method include a method for directly contacting an extruded product with a cooling medium such as cold air and cooling water, and a method for contacting an extruded product with a roll or a press cooled by a refrigerant. The method for contacting an extruded product with a roll or a press cooled by a refrigerant is preferable from the viewpoint of excellent control of the membrane thickness. The cooling temperature in the case is not particularly limited as long as it is a temperature at which the extruded product solidifies. From the viewpoint of easiness to suppress MD orientation at the time of sheet forming, not less than 60° C. is preferable, and not less than 80° C. is more preferable.

Next, at the stretching step (d), the sheet-like formed product through the sheet forming step is stretched in the uni- or multi-axial directions. Examples of a method for stretching a sheet-like formed product include MD uniaxial stretching by a roll stretching machine, TD uniaxial stretching by a tenter, successive biaxial stretching by a combination of a roll stretching machine and a tenter or a combination of a plurality of tenters, and simultaneous biaxial stretching by a simultaneous biaxial tenter or inflation molding. The simultaneous biaxial stretching is preferable from the viewpoint of obtaining a PO microporous membrane having a higher isotropy. From the viewpoint of a balance among the uniformity of the membrane thickness, the tensile elongation, the porosity, and the average pore size in the PO microporous membrane, the total area ratio (MD×TD) by stretching is preferably not less than 8 times, more preferably not less than 15 times, and still more preferably not less than 30 times. Particularly at an area ratio of not less than 30 times, a separator having high strength is easily obtained.

At the extracting step (e), the plasticizer and the inorganic material, if necessary, are extracted from the stretched film obtained through the stretching step. Examples of an extracting method include a method for immersing a stretched film in an extraction solvent, or a method for contacting an extraction solvent with a stretched film by spraying the extraction solvent with a shower or the like. As the extraction solvent, those that are a poor solvent to the polyolefin and a good solvent to the plasticizer and the inorganic material, and have a boiling point lower than the melting point of the polyolefin are desirable. Examples of such an extraction solvent include hydrocarbons such as n-hexane and cyclohexane; halogenated hydrocarbons such as methylene chloride, 1,1,1-trichloroethane, and fluorocarbon compounds; alcohols such as ethanol and isopropanol; ketones such as acetone and 2-butanone; and alkaline water. These extraction solvents are used alone, or two or more thereof are selected and used in combination.

Prior to the stretching step, the plasticizer and the inorganic material, if necessary, may be extracted from the sheet-like formed product. The inorganic material may be entirely or partially extracted at one of all the steps, or may be left in the separator. The order, the method, and the number of times of extraction are not particularly limited. Further, the inorganic material may not be extracted when necessary. At the time of extraction, the membrane shrinks in the TD by removal of the solvent, so that orientation properties in the MD and the TD are changed. For this reason, the orientation properties are preferably controlled by tension control.

Then, at the post-processing step (f), the stretched film through the extracting step is heated at a predetermined temperature to heat-set. Thereby, a microporous membrane that is made of the polyolefin and may be used also as the PO microporous membrane is obtained. Examples of a method for heat treatment at this time include a heat setting method in which stretching and relaxation operation are performed using a tenter or a roll stretching machine. The relaxation operation refers to a shrinking operation performed on the MD and/or the TD of the membrane at a predetermined temperature and a predetermined relaxation rate. The relaxation rate is a value obtained by dividing the MD size of the membrane after the relaxation operation by the MD size of the membrane before the relaxation operation, a value obtained by dividing the TD size of the membrane after the relaxation operation by the TD size of the membrane before the relaxation operation, or a value obtained by multiplying the relaxation rate of the membrane in the MD by the relaxation rate thereof in the TD in the case where the membrane is relaxed both in the MD and the TD.

The predetermined temperature is preferably not less than 100° C. from the viewpoint of the thermal shrinkage rate, and preferably less than 135° C. from the viewpoint of the porosity and the permeability. The relaxation rate is preferably not more than 0.9 times, and more preferably not more than 0.80 times from the viewpoint of the thermal shrinkage rate. Moreover, the relaxation rate is preferably not less than 0.6 times from the viewpoint of preventing occurrence of wrinkles and the viewpoint of the porosity and the permeability. The relaxation operation may be performed both in the MD and the TD. However, the relaxation operation may be performed only in one direction, i.e., in the MD or in the TD. Thereby, the thermal shrinkage rate can be reduced not only in the operation direction but in the direction intersecting perpendicular to the operation.

In addition to the respective steps (a) to (f), as a step for obtaining a PO microporous membrane that is a laminated body, the method for producing a PO microporous membrane according to the present embodiment can comprise a step of layering several microporous membranes made of a polyolefin that is a single layer body. Moreover, the method for producing a PO microporous membrane according to the present embodiment may comprise a surface treatment step of performing a surface treatment such as electron beam irradiation, plasma irradiation, application of a surface active agent, and chemical modification on a surface of a microporous membrane made of a polyolefin. Further, the above-mentioned inorganic material may be applied to one side or both sides of a microporous membrane made of a polyolefin to obtain a PO microporous membrane including an inorganic material layer. In this case, from the viewpoint of obtaining favorable isolation properties, the proportion of the thickness of the inorganic material layer to that of the entire PO microporous membrane is preferably not less than 1%, and more preferably not less than 5%. Moreover, from the viewpoint of ensuring high strength, the proportion of the thickness of the inorganic material layer is preferably not more than 99%, and more preferably not more than 95%.

Further, after the above post-processing step, an aging treatment is performed on a master roll obtained by rolling the microporous membrane at a predetermined temperature, and subsequently, the master roll can also be subjected to a rewinding operation. Thereby, the orientation of the microporous membrane within the master roll, which is usually strongly orientated in the MD, is easily relaxed, so that a PO microporous membrane having high isotropy is easily obtained.

The temperature at the time of performing the aging treatment of the master roll is preferably not less than 35° C., more preferably not less than 45° C., and still more preferably not less than 60° C. From the viewpoint of keeping the permeability of the PO microporous membrane, the temperature is preferably not more than 120° C. The time needed for the aging treatment is not limited, and preferably not less than 24 hours because the above effect easily develops.

The various characteristics (parameters) in the present embodiment are measured in accordance with measuring methods in Examples mentioned below, unless otherwise specified.

The PO microporous membrane thus obtained is processed into a desired shape, and then, used as a separator according to the present embodiment. The separator composed of the PO microporous membrane according to the present embodiment can realize a separator that shows higher cycle characteristics at a high temperature and has higher resistance against foreign matters than the conventional separator does particularly in the case of use as a separator for high capacity batteries.

On the other hand, a lithium ion secondary battery according to the present embodiment includes the separator according to the present embodiment, a positive electrode, a negative electrode, and an electrolytic solution. Except inclusion of the separator according to the present embodiment as a separator, the lithium ion secondary battery may include the same members as those in a known lithium ion secondary battery, have the same structure, and be produced by the same method.

The separator according to the present embodiment is particularly suitable for applications to lithium ion secondary batteries for laptop personal computers, electric tools, electric vehicles, and hybrid vehicles that require a high capacity. This application enables the lithium ion secondary battery to be given safety and battery characteristics superior to those in the conventional one. The separator according to the present embodiment is also suitable as a separator for high capacity cylindrical lithium ion secondary batteries.

Next, other present embodiment will be described. The PO microporous membrane according to the present embodiment has a content of aluminum of not more than 70 ppm. The content of aluminum is preferably not more than 50 ppm, more preferably not more than 30 ppm, still more preferably not more than 10 ppm, and particularly preferably not more than 3 ppm. At a content of aluminum of not more than 70 ppm, the cycle characteristics tend to be favorable in the case where the PO microporous membrane according to the present embodiment is used as a separator for batteries. Moreover, the foreign matters in the PO microporous membrane tend to be decreased. Although the reason is not certain, it is presumed that if a large amount of aluminum remains in the raw material, a gel on the basis of aluminum is produced and is likely to be foreign matters. It is also presumed that such foreign matters easily reduce the cycle characteristics. Further, if the foreign matters are little, the membrane thickness can be reduced to 10 μm or 5 μm, which is suitable as a separator for high capacity lithium ion secondary batteries in recent years. On the other hand, the lower limit of the content of aluminum in the PO microporous membrane is not particularly limited. The content of aluminum is preferably not less than 0.1 ppm from the viewpoint of adsorbing hydrogen fluoride that is derived from decomposition of an electrolyte and gives an adverse influence on a cell reaction.

Examples of a method for adjusting the content of aluminum to not more than 70 ppm include a variety of methods because the shape and source of aluminum to be mixed are various. Reduction in the concentration of organoaluminum in a polymerization process of polyolefin and washing of a polyolefin raw material or the PO microporous membrane by an acid or an alkali are preferable.

In the present embodiment, the total content of calcium, magnesium, zinc, and barium in the PO microporous membrane is preferably not more than 300 ppm. The total content is more preferably not more than 200 ppm, still more preferably not more than 150 ppm, particularly preferably not more than 50 ppm, and extremely preferably not more than 10 ppm. On the other hand, the lower limit of the total content thereof is preferably not less than 0.1 ppm from the viewpoint of adsorbing hydrogen fluoride that is derived from decomposition of an electrolyte and gives an adverse influence on a cell reaction.

At a total content of these metals of not more than 300 ppm, the cycle characteristics tend to be favorable in the case where the PO microporous membrane is used as a separator for batteries. It is presumed that this is because the amount of metals such as calcium, magnesium, zinc, and barium to be electrodeposited on the electrode is decreased in a cycle test in which charge and discharge are repeated.

These metals are mainly derived from a metallic soap added after production of a polyolefin, or the like. Examples of a method for adjusting the total content of the above metals to not more than 300 ppm include adjustment of the amount of the metallic soap to be blended, which is added to the polyolefin after polymerization. Examples thereof also include adjustment of the amount of the metallic soap to be blended by washing of a commercially available polyolefin raw material by an acid or washing by an acid in the manufacturing process of the PO microporous membrane. Examples thereof further include a method for installing a filter in an extruder used when the PO microporous membrane is produced, and filtering metals.

The polyolefin used as a material for the PO microporous membrane according to the present embodiment is not particularly limited, and examples thereof include polyethylenes produced using an organoaluminum compound as a promoter. Such polyethylenes can be produced using a Ziegler-Natta catalyst, a metallocene catalyst, and the like in which an organoaluminum compound is used as a promoter. Other than the polyethylenes produced using an organoaluminum compound as a promoter, polyethylenes produced using a chromium catalyst and low density polyethylenes obtained by using a peroxide as a catalyst can also be used as the above polyolefin, for example. Examples of other polyolefins include polypropylenes, methylpentene copolymers, and cyclic olefin copolymers such as ethylene tetracyclododecene copolymers and ethylene norbornene copolymers. From the viewpoint of mechanical strength and stretchability at the time of production of the membrane, the polyolefin preferably contains not less than 30% by mass of polyethylene produced using an organoaluminum compound as a promoter.

The membrane thickness of the PO microporous membrane in the present embodiment is preferably in the range of not less than 2 μm and not more than 100 μm, more preferably in the range of not less than 5 μm and not more than 40 μm, and still more preferably in the range of not less than 5 μm and not more than 35 μm. At a membrane thickness of not less than 2 μm, more sufficient mechanical strength tends to be obtained. On the other hand, at a membrane thickness of not more than 100 μm, the separator tends to be advantageous in increase in the capacity of the battery when the PO microporous membrane is used as a battery separator because the volume occupied by the separator is reduced.

The porosity of the PO microporous membrane in the present embodiment is preferably in the range of not less than 25% and not more than 90%, more preferably in the range of not less than 30% and not more than 85%, and still more preferably in the range of not less than 35% and not more than 80%. At a porosity of not less than 25%, the permeability of lithium ions tends to be hardly reduced. On the other hand, at a porosity of not more than 90%, the possibility of self-discharge tends to be small and the reliability of the battery tends to be improved when the PO microporous membrane is used as a battery separator.

The air permeability of the PO microporous membrane in the present embodiment is preferably in the range of not less than 1 second and not more than 500 seconds, more preferably in the range of not less than 10 seconds and not more than 450 seconds, and still more preferably in the range of not less than 50 seconds and not more than 400 seconds. At an air permeability of not less than 1 second, self-discharge tends to be reduced in the case where the PO microporous membrane is used as a separator for batteries. At an air permeability of not more than 500 seconds, favorable charging and discharging characteristics tend to be obtained.

The puncture strength (absolute strength) of the PO microporous membrane in the present embodiment is preferably in the range of not less than 1 N and not more than 20 N, more preferably in the range of not less than 2 N and not more than 15 N, and still more preferably in the range of not less than 3 N and not more than 10 N. In the case where the PO microporous membrane is used as a separator for batteries, the puncture strength of not less than 1 N is preferable from the viewpoint of being capable of reducing production of a pinhole and a crack when a sharp portion of the electrode material or the like pierces in the separator. On the other hand, at a puncture strength of not more than 20 N, shrinkage tends to be small, so that the isolation properties between the positive electrode and the negative electrode are easily kept.

The tensile strength of the PO microporous membrane in the present embodiment is preferably not less than 5 MPa and not more than 500 MPa, more preferably not less than 10 MPa and not more than 400 MPa, and still more preferably not less than 20 MPa and not more than 300 MPa both in the MD and the TD. At a tensile strength of not less than 5 MPa, the PO microporous membrane is hardly broken for tension at the time of winding a battery. At a tensile strength of not more than 500 MPa, shrinkage tends to be small, so that the isolation properties between the positive electrode and the negative electrode are easily kept.

The tensile elongation of the PO microporous membrane in the present embodiment is preferably not less than 20% and not more than 500%, more preferably not less than 25% and not more than 400%, and still more preferably not less than 30% and not more than 300% both in the MD and the TD. At a tensile elongation of not less than 20%, the PO microporous membrane is hardly broken for the foreign matters. At a tensile elongation of not more than 500%, in the case where the PO microporous membrane is used as a battery separator, the separator is hardly extended at the time of winding a battery, so that windability is improved.

Next, an example of the method for producing a PO microporous membrane according to the present embodiment will be described.

Examples of the method for producing a PO microporous membrane according to the present embodiment include a method comprising the respective steps (a) to (d) below:
(a) a kneading step of kneading a polyolefin composition;
(b) a sheet forming step of forming a sheet from the kneaded product through the kneading step;
(c) a sheet stretching step of stretching the sheet through the sheet forming step to form a stretched body; and
(d) a microporous membrane forming step of forming a microporous membrane from the sheet or the stretched body.

The kneading step (a) is a step of kneading a polyolefin and a polyolefin composition containing a plasticizer and/or an inorganic material when necessary, for example. Examples of the polyolefin used at the kneading step (a) include homopolymers of ethylene or propylene, and copolymers obtained by polymerizing at least two or more monomers selected from the group consisting of ethylene, propylene, 1-butene, 4-methyl-1-pentene, 1-hexene, 1-octene, and norbornene. These may be a mixture.

In the case where polyethylene is used as the polyolefin, the polyethylene is preferably high density polyethylenes (homopolymers) from the viewpoint of being capable of performing heat setting at a higher temperature without pores being clogged, while it may be low density polyethylenes.

The weight average molecular weight (Mw) of the entire PO microporous membrane is preferably not less than 100,000 and not more than 1,200,000, and more preferably not less than 150,000 and not more than 800,000. An Mw of not less than 100,000 tends to easily develop the membrane breaking resistance at the time of melting. An Mw of not more than 1,200,000 tends to facilitate extrusion in the extrusion step described later, and to make relaxation of a shrinking force faster at the time of melting to improve heat resistance.

It is also preferable from the viewpoint of improved quality of the membrane that the PO microporous membrane includes at least a polyolefin having an Mw of not more than 500,000. It is presumed that this is because in the case where the PO microporous membrane includes a polyolefin having an Mw of not more than 500,000, the proportion of the ultrahigh molecular weight component in the entire composition is relatively reduced, so that a gel of the ultrahigh molecular weight component on the basis of aluminum is hardly produced. It is particularly preferable from the above viewpoint that only a polyolefin having an Mw of not more than 500,000 be used as the polyolefin.

At the kneading step (a), in the case where a polymer other than the polyethylene is blended, the proportion of the polymer other than the polyethylene is preferably 1 to 80% by mass, more preferably 2 to 50% by mass, still more preferably 3 to 20% by mass, and particularly preferably 5 to 10% by mass based on the entire polymer. At a proportion of the polymer other than the polyethylene of not less than 1% by mass, if the polymer other than the polyethylene is a polymer having higher modulus of elasticity than that of the polyethylene, for example, the polymer tends to keep compression resistance such that the polymer can endure expansion of the electrode at the time of charge and discharge of the battery. If the polymer other than the polyethylene is a polymer having a higher melting point than that of the polyethylene, the heat resistance tends to be improved. On the other hand, at a proportion of the polymer other than the polyethylene of not more than 80% by mass, the permeability tends to be ensured by improvement in uniformity with the polyethylene.

As the polymer other than the polyethylene, polypropylene is preferable from the viewpoint of the uniformity with the polyethylene and the heat resistance.

Known additives such as a metallic soap such as magnesium stearate, calcium stearate, and zinc stearate, an ultraviolet absorbing agent, a light stabilizer, an antistatic agent, an anti-fogging agent, and a color pigment may be further mixed with the polyolefin composition used at the kneading step (a).

Examples of the plasticizer includes an organic compound that can form a uniform solution with a polyolefin at a temperature not more than the boiling point thereof. Specifically, examples of the plasticizer include decalin, xylene, dioctyl phthalate, dibutyl phthalate, stearyl alcohol, oleyl alcohol, decyl alcohol, nonyl alcohol, diphenyl ether, n-decane, n-dodecane, and paraffin oil. Among these, paraffin oil and dioctyl phthalate are preferable from the viewpoint of a uniform pore structure. The plasticizers are used alone, or two or more thereof are used in combination.

The proportion of the plasticizer to be blended is not particularly limited, and is preferably not less than 20% by mass based on the total mass of the polyolefin, the plasticizer, and the inorganic material blended when necessary from the viewpoint of the porosity of the PO microporous membrane to be obtained. The proportion is preferably not more than 90% by mass based on the total mass of the polyolefin, the plasticizer, and the inorganic material blended when necessary from the viewpoint of the viscosity.

Examples of the inorganic material include oxide ceramics, nitride ceramics, clay minerals, and glass fibers. These can be used alone, or two or more thereof can be used together. These can be added to the polyolefin composition within the range in which the effect of the present invention is not impaired.

As a kneading method at the kneading step (a), for example, first, the raw materials are partially or entirely mixed in advance using a Henschel mixer, a ribbon blender, a tumbler blender, or the like when necessary. Next, all the raw materials are molten and kneaded by a screw extruder such as a single screw extruder and a twin screw extruder, a kneader, a mixer, or the like.

On kneading, preferably, after an antioxidant is mixed in a predetermined concentration with the raw material polyolefin, an atmosphere around the mixture is replaced by a nitrogen atmosphere, and the melting and kneading is performed with the nitrogen atmosphere being maintained. The temperature at the time of melting and kneading is preferably not less than 160° C., and more preferably not less than 180° C. Moreover, the temperature is preferably less than 300° C., and more preferably less than 240° C.

Prior to the sheet forming step (b), the kneaded product through the kneading step (a) may be extruded by an extruder having a T-shaped die, a cyclic die, or the like at an extruding step. At this time, the kneaded product may be extruded as a single layer or a laminated layer. The conditions on extrusion may be the same as conventional.

The sheet forming step (b) is a step of forming the kneaded product through the kneading step or the kneaded product extruded through the extruding step into a sheet form (irrespective of a single layer or a laminated layer). At this time, the kneaded product may be formed into a single layer sheet form, or may be formed into a laminated sheet form. Examples of a method for forming a sheet include a method for solidifying a kneaded product molten, kneaded, and extruded by compression cooling. Examples of a cooling method include a method for directly contacting a kneaded product with a cooling medium such as cold air and cooling water, and a method for contacting a kneaded product with a roll and/or a press cooled by a refrigerant. The method for contacting a kneaded product with a roll and/or a press cooled by a refrigerant is preferable from the viewpoint of excellent control of the membrane thickness.

The sheet stretching step (c) is a step of stretching the sheet through the sheet forming step into a stretched body. Examples of a method for stretching a sheet include MD (the stretch direction of a stretching process apparatus) uniaxial stretching by a roll stretching machine, TD (the width direction of the stretching process apparatus) uniaxial stretching by a tenter, successive biaxial stretching by a combination of a roll stretching machine and a tenter or a combination of a plurality of tenters, and simultaneous biaxial stretching by a simultaneous biaxial tenter or inflation molding. From the viewpoint of a balance among uniformity of the membrane thickness, tensile elongation, porosity, and the average pore size in the PO microporous membrane, the total area ratio (MD×TD) by stretching is preferably not less than 8 times, more preferably not less than 15 times, and still more preferably not less than 30 times. At a total area ratio of not less than 8 times, a PO microporous membrane having high strength and favorable thickness distribution is easily obtained.

The microporous membrane forming step (d) is a step of forming a microporous membrane from the sheet through the sheet forming step (b) or the stretched body through the sheet stretching step (c). As a method for forming a microporous membrane from the sheet or the stretch body, any of the following methods can be used: a wet method which is a method for forming pores by extracting a plasticizer, an inorganic material, and the like blended with a polyolefin composition in advance; a method for forming pores only by stretching using a lamellar structure of a polyolefin (lamellar pore-forming method); or a dry method which is a method for forming pores only by stretching using an interface between a polyolefin and an inorganic material (filler pore-forming method). These methods can also be used in combination.

In the case where the polyolefin composition contains the plasticizer and the inorganic material, the microporous membrane can be formed by extracting these from the sheet or the stretched body. The plasticizer and the inorganic material is extracted by a method for immersing a sheet or a stretched body in an extraction solvent or a method for spraying an extraction solvent on a sheet or a stretched body. As the extraction solvent, those that are a poor solvent to the polyolefin and a good solvent to the plasticizer and the inorganic material, and have a boiling point lower than the melting point of the polyolefin are desirable. Examples of such an extraction solvent include hydrocarbons such as n-hexane and cyclohexane; halogenated hydrocarbons such as methylene chloride, 1,1,1-trichloroethane, and fluorocarbon compounds; alcohols such as ethanol and isopropanol; ketones such as acetone and 2-butanone; and alkaline water. These are used alone, or two or more thereof are used in combination.

The plasticizer and the inorganic material may be entirely or partially extracted at one of all the steps, or may be left in the PO microporous membrane. The order, the method, and the number of times of extraction are not particularly limited.

On the other hand, in the case where the dry method is used, the sheet stretching step (c) can serve as the microporous membrane forming step (d). Moreover, the same stretching process as that in the sheet stretching step (c) may be performed on the membrane through the microporous membrane forming step (d).

In addition to the respective steps (a) to (d), the method for producing a PO microporous membrane according to the present embodiment may also comprise a post-processing step of further heat-treating the membrane through the microporous membrane forming step (d). Examples of a method for heat treatment include a heat setting method for performing stretching and relaxation operation using a tenter or a roll stretching machine. The relaxation operation refers to a shrinking operation performed on the MD and/or the TD of the membrane at a predetermined temperature and a predetermined relaxation rate. The relaxation rate is a value obtained by dividing the MD size of the membrane after the relaxation operation by the MD size of the membrane before the relaxation operation, a value obtained by dividing the TD size after the relaxation operation by the TD size of the membrane before the relaxation operation, or a value obtained by multiplying the relaxation rate of the membrane in the MD by the relaxation rate thereof in the TD in the case where the membrane is relaxed both in the MD and the TD.

The predetermined temperature (temperature in the relaxation operation) is preferably not less than 100° C. from the viewpoint of the thermal shrinkage rate, and preferably less than 135° C. from the viewpoint of the porosity and the permeability. The relaxation rate is preferably not more than 0.9 times from the viewpoint of the thermal shrinkage rate, and more preferably not more than 0.8 times. Moreover, the relaxation rate is preferably not less than 0.6 times from the viewpoint of preventing occurrence of wrinkles and the viewpoint of the porosity and the permeability. The relaxation operation may be performed both in the MD and the TD. However, the relaxation operation may be performed only in one direction, i.e., in the MD or in the TD. Thereby, the thermal shrinkage rate can be reduced not only in the operation direction but in the direction intersecting perpendicular to the operation.

The method for producing a PO microporous membrane according to the present embodiment can comprise a step of layering several microporous membranes made of a polyolefin which is a single layer body as a step for obtaining a PO microporous membrane which is a laminated body. Moreover, the method for producing a PO microporous membrane according to the present embodiment may comprise a surface treatment step of performing a surface treatment such as electron beam irradiation, plasma irradiation, application of a surface active agent, and chemical modification on a surface of a microporous membrane made of a polyolefin.

The PO microporous membrane produced by the production method according to the present embodiment has quality higher than that of the conventional microporous membrane, and can improve the cycle characteristics of the battery. The above-mentioned various parameters are measured in accordance with measuring methods in Examples described later, unless otherwise specified.

EXAMPLES

Hereinafter, the present embodiment will be described in detail with Examples and Reference Examples. Here, the present embodiment is not limited to the following Examples unless it departs from the gist of the invention. The respective characteristics in Examples 1-1 to 1-18 and Comparative Examples 1-1 to 1-5 were measured by the following methods.

(1) Viscosity Average Molecular Weight (Mv)

The limit viscosity [η] in a decalin solvent at 135° C. was determined in accordance with ASTM-D4020. The Mv of polyethylene was calculated by the following expression from the limit viscosity [η].

$$[\eta]=6.77\times10^{-4}Mv^{0.67}$$

Similarly, the Mv of polypropylene was calculated by the following expression from the limiting viscosity [η].

$$[\eta]=1.10\times10^{-4}Mv^{0.80}$$

(2) Membrane Thickness (μm)

The membrane thickness of the PO microporous membrane was measured at a room temperature of 23±2° C. using a KBM (trademark), a micro thickness meter made by Toyo Seiki Seisaku-sho, Ltd.

(3) Porosity (%)

A 10 cm×10 cm square was cut out from the PO microporous membrane to obtain a sample, and the volume (cm$^3$) and mass (g) of the sample were determined. From the volume, the mass, and the membrane density (g/cm$^3$), the porosity of the PO microporous membrane was calculated by the following expression.

Porosity=(volume−mass/membrane density)/volume×100

The calculation was performed at a fixed membrane density of 0.95 g/cm$^3$.

(4) Air Permeability (sec)

In accordance with JIS P-8117, the air permeability of the PO microporous membrane was measured by a Gurley type densometer (made by Toyo Seiki Seisaku-sho, Ltd., G-B2 (trademark)).

(5) Puncture Strength (N)

A KES-G5 (trademark), a handy-type compression tester made by Kato Tech Co., Ltd. was used. First, the microporous membrane was fixed by a sample holder. Next, a puncture test was performed on a central part of the fixed PO microporous membrane. The maximum puncture load at that time (N) was measured, and defined as puncture strength. Measurement conditions were as follows.

Diameter of an opening of the sample holder: 11.3 mm
Radius of curvature of a needle tip: 0.5 mm
Puncture rate: 2 mm/sec
Atmosphere temperature: 23±2° C.

(6) Tensile Strength (MPa), Tensile Elongation (%)

In accordance with JIS K7127, using a tension tester Autograph AG-A type (trademark) made by Shimadzu Corporation, the tensile strength and the tensile elongation were measured for the MD and the TD of a PO microporous membrane sample (shape; a rectangle measuring a width of 10 mm×a length of 60 mm). In this case, the distance between chucks was set at 20 mm. In order to prevent slip of the sample during the test, a fluororubber having a thickness of 1 mm was applied to the inside of the chuck in the tension tester.

The tensile strength (MPa) was determined by dividing strength at the time of breakage of the sample by a cross-sectional area of the sample before the test. The tensile elongation (%) was determined by dividing the amount of elongation (mm) until the sample broke by the distance between the chucks (20 mm), and multiplying the divided value by 100.

The measurement conditions were set at a temperature of 23±2° C., a chuck pressure of 0.30 MPa, and a tensile rate 100 mm/min. In a sample in which the distance between the chucks of 20 mm could not be ensured, a strain rate was constant.

(7) Thermal Shrinkage Rate in TD at 105° C. and that at 120° C. (%)

A sample obtained by cutting the PO microporous membrane into a size of 100 mm in the MD and 100 mm in the TD was placed for 1 hour in an oven at a predetermined temperature (105° C. or 120° C.). At this time, the sample was sandwiched between two sheets of paper so that the sample might not be exposed to warm air directly. The sample was extracted from the oven and cooled. Subsequently, the length (mm) of the sample in the TD was measured, and the thermal shrinkage rates calculated by the following expression were defined as the thermal shrinkage rate in the TD at 105° C. and that at 120° C. (105° C. thermal shrinkage rate, 120° C. thermal shrinkage rate, respectively). In the case where the sample length could not be ensured, as a long sample as possible within the range of 100 mm×100 mm was used.

Thermal shrinkage rate (%)=(100−length in TD after heating (mm))/100×100

(8) Measurement of Content of Aluminum

Approximately 0.2 g of a polyolefin raw material or a PO microporous membrane sample was weighed and placed in a seal decomposition vessel made of a fluororesin. 5-mL high purity nitric acid was added there, and heated at 200° C. for 20 minutes by a microwave digestion system (made by Milestone Inc., trade name "ETHOS TC," 125571). Then, the volume was fixed at 50 mL with ultrapure water.

Subsequently, measurement was performed by an ICP mass spectrometer (made by Thermo Fisher Scientific K.K., trade name "X series X7 ICP-MS," X0126).

An internal standard method was used as a determination method, and determination was performed using a four-point calibration curve at concentrations of each element of 0 μg/L, 2 μg/L, 10 μg/L, and 20 μg/L. A test liquid for measurement was diluted so as to be within the range of the calibration curve. Cobalt (Co) was used as an internal standard element.

(9) Battery Capacity (mAh), Resistance Against Foreign Matters (pressure/N), and Capacity Retention (%)

a. Production of Positive Electrode 92.2% by mass of lithium cobalt complex oxide $LiCoO_2$ as a positive active substance, 2.3% by mass of flake graphite and 2.3% by mass of acetylene black as an electric conductive substance, and 3.2% by mass of polyvinylidene fluoride (PVDF) as a binder were dispersed in N-methyl-pyrrolidone (NMP) to prepare a slurry. This slurry was applied to one surface of an aluminum foil having a thickness of 15 μm and serving as a positive electrode collector by a die coater, and dried at 130° C. for 3 minutes. Subsequently, the product was compression formed by a roll press machine. At this time, adjustment was made such that the amount of the positive electrode active substance to be applied was 250 g/m$^2$, and the bulk density of the active substance was 3.00 g/cm$^3$. The obtained formed article was slit at a width of 57.0 mm to obtain a band-like positive electrode.

b. Production of Negative Electrode 96.9% by mass of an artificial graphite as a negative electrode active substance, and 1.4% by mass of an ammonium salt of carboxymetyl cellulose and 1.7% by mass of a styrene-butadiene copolymer latex as a binder were dispersed in purified water to prepare a slurry. This slurry was applied to one surface of a copper foil having a thickness of 12 μm and serving as a negative electrode collector by a die coater, and dried at 120° C. for 3 minutes. Subsequently, the product was compression formed by a roll press machine. At this time, adjustment was made such that the amount of the negative electrode active substance to be applied was 106 g/m$^2$, and the bulk density of the active substance was 1.35 g/cm$^3$. The obtained formed article was slit at a width of 58.5 mm to obtain a band-like negative electrode.

c. Preparation of Nonaqueous Electrolyte $LiPF_6$ as a solute was dissolved in a mixed solvent of ethylene carbonate:dimethyl carbonate:ethylmethyl carbonate=1:1:2 (volume ratio) such that the concentration was 1 mol/lit, to prepare a nonaqueous electrolyte.

d. Assembly of Battery

The positive electrode, the separator described later, and the negative electrode were laminated in this order, and a rolled electrode body was produced by the conventional method. The number of rolling was adjusted according to the thickness of the separator. An outermost peripheral edge of the obtained rolled electrode body was fixed by applying an insulating tape. A nickel lead led from the negative electrode was welded to a battery can, an aluminum lead led from the positive electrode was welded to a safety valve, and the rolled electrode body was inserted into the battery can made of SUS. Subsequently, 5 g of the nonaqueous electrolyte was injected into the battery can, and a cover was caulked to the battery can with a gasket. Thus, a cylindrical secondary battery having an outer diameter of 18 mm and a height of 65 mm was obtained. The battery capacity was defined as a capacity when this cylindrical secondary battery was charged and subsequently discharged at a rate of 0.2 C (a current 0.2 times one-hour charge rate (1 C) of a rated electric capacity).

e. Evaluation of Resistance Against Foreign Matters/Pressure (N)

After the cylindrical secondary battery was charged, the rolled electrode body was extracted from the inside of the battery in an argon box. The insulating tape at the outermost periphery of the rolled electrode body was cut in the direction parallel to the cylinder axis of the battery by a pair of scissors, and the rolled electrode body was unrolled halfway. A) 5 mg of an iron ball having a diameter of 0.8 mm and B) 5 mg of a cylindrical iron piece having a diameter of 0.8 mm and a length of 1.6 mm were disposed so as to contact a portion 20 mm in the rolling direction from the position at which the rolled electrode body was cut. The rolled electrode body was rolled back, and then fixed again by an insulating tape. The cylindrical iron piece B was assumed as a substance slipping off from the electrode edge part, and was disposed such that the long side of the iron piece might be parallel to the MD of the separator.

The rolled electrode body after rewinding was placed into a PE bag with a chuck, and placed on a stand such that the portion of the rolled electrode body in which the iron ball and the iron piece were disposed faced upwards. Next, a pressurizing jig was prepared in which a nitrile rubber sheet having a thickness of 2 mm was applied onto the bottom of a metal prism having a cross section of a 10 mm square. In the state where the nitrile rubber sheet side of the pressurizing jig faced the rolled electrode body, the pressurizing jig was descended at a rate of 0.1 mm/sec. Then, the pressurizing jig was pressed against the rolled electrode body. Subsequently, pressure was further applied, and the pressure at the time of igniting (N) was measured. The value of this pressure was defined as resistance against foreign matters (A+B). Other than the above, only 5 mg of the cylindrical iron piece having a diameter of 0.8 mm and a length of 1.6 mm was disposed, pressure was applied, and the pressure at the time of igniting (N) was measured in the same manner. The value of this pressure was defined as resistance against foreign matters (B). The higher pressure means favorable resistance against foreign matters, and particularly the resistance against foreign matters (B) is assumed as the resistance against the substance slipping off from the electrode edge part.

f. Cycle Characteristics at High Temperature (Capacity Retention (%))

After the cylindrical secondary battery was assembled in the manner described in d above, initial charging was performed, the cylindrical secondary battery was accommodated in an oven kept at 45° C., and an aging treatment was performed. Then, in the state where the battery was accommodated in the oven kept at 45° C., a charging and discharging cycle test was performed 300 times at a rate of 0.5 C (a current 0.5 times one-hour charge rate (1 C) of the rated electric capacity). The capacity at the third cycle was defined as 100 (%), and the capacity at the 300th cycle was calculated as the capacity retention (%). The higher capacity retention means favorable cycle characteristics at a high temperature.

Example 1-1

45% by mass of a homopolymer polyethylene having an Mv of 700,000 and the content of aluminum of 5 ppm, 45% by mass of a homopolymer polyethylene having an Mv of 300,000 and the content of aluminum of 5 ppm, and 10% by mass of a mixture of a homo polypropylene having an Mv of 400,000 and the content of aluminum of 5 ppm and a homo polypropylene having an Mv of 150,000 and the content of aluminum of 5 ppm (mass ratio=4:3, and hereinafter, referred to as the "PP") were dry blended using a tumbler blender. 1% by mass of pentaerythrityl-tetrakis[3-(3,5-di-t-butyl-4-hydroxyphenyl)propionate] was added as an antioxidant to 99% by mass of the obtained polyolefin mixture, and was dry blended again using the tumbler blender, thereby to obtain a mixture. The obtained mixture was fed to a twin screw extruder by a feeder under a nitrogen atmosphere. Liquid paraffin (kinematic viscosity of $7.59 \times 10^{-5}$ m$^2$/s at 37.78° C.) was injected into a cylinder of the extruder by a plunger pump. The operating conditions on the feeder and the pump were adjusted such that the proportion of the liquid paraffin to the entire mixture to be extruded was 65% by mass, namely, a polymer concentration (hereinafter, abbreviated to "PC" in some cases) was 35% by mass.

Next, the mixture and the liquid paraffin were molten and kneaded within the twin screw extruder. The melting and kneading conditions were a temperature: 230° C., a screw rotation speed: 240 rpm, and an amount of discharge: 12 kg/h.

Then, the obtained molten and kneaded product was extruded through a T-die onto a cooling roller whose surface temperature was controlled at 90° C. The extruded product was contacted with the cooling roller, molded (casted), and cooled and solidified, thereby to obtain a gel sheet having a membrane thickness of 2200 μm as an original sheet, which was a sheet-like formed product.

Next, the obtained gel sheet was guided to a simultaneous biaxial tenter stretching machine to obtain a stretched sheet by biaxial stretching. The stretching conditions set were an MD ratio of 7.0 times, a TD ratio of 7.5 times, i.e., an area ratio of 7×7.5=52.5 times, and a biaxial-stretching temperature of 123° C.

Next, the obtained stretched film was guided to a methyl ethyl ketone tank, and sufficiently immersed in methyl ethyl ketone to extract and remove liquid paraffin as the plasticizer, followed by drying and removal of methyl ethyl ketone.

Next, the stretched film was guided to a TD tenter in order to perform heat setting (hereinafter, abbreviated to "HS" in some cases). Then, HS was performed on the conditions of a heat setting temperature of 130° C., and a stretch ratio of 1.7 times, and the relaxation operation at a relaxation rate (HS relaxation rate) of 0.8 times was performed.

Next, a master roll (MR) obtained by taking up 1000 m of the stretched film was left for 24 hours in a 60° C. thermostatic chamber, and was subjected to an aging treatment (MR aging treatment). Next, the master roll was rolled back at a rolling tension of 10 kg/m to obtain a PO microporous membrane for high capacity lithium ion secondary batteries. The respective characteristics of the obtained PO microporous membrane and the battery provided with the PO microporous membrane as a separator were evaluated as mentioned above. Table 1 shows the results.

Examples 1-2 to 1-18, Comparative Examples 1-1 to 1-5

A PO microporous membrane was obtained in the same manner as that in Example 1-1 except that the respective conditions were changed as shown in Tables 1 to 3. In Example 1-7, however, a polyethylene having an Mv of 800,000 and the content of aluminum of 12 ppm was used instead of the polyethylene having an Mv of 700,000 and the content of aluminum of 5 ppm in Example 1-1, and a polyethylene having an Mv of 200,000 and the content of aluminum of 12 ppm was used instead of the polyethylene having an Mv of 300,000 and the content of aluminum of 5 ppm in Example 1-1. In Examples 1-8 and 1-9, a film obtained by further immersing the stretched film immediately after HS in ethanol and washing the film by 1 N of hydrochloric acid, and then by water was subjected to the subsequent aging treatment and rewind to obtain a PO microporous membrane for high capacity lithium ion secondary batteries. The respective characteristics of the obtained PO microporous membrane and the battery provided with the PO microporous membrane as a separator were evaluated as mentioned above. Tables 1 to 3 show the results.

TABLE 1

| | Example | | | | | | | | |
|---|---|---|---|---|---|---|---|---|---|
| | 1-1 | 1-2 | 1-3 | 1-4 | 1-5 | 1-6 | 1-7 | 1-8 | 1-9 |
| PC (% by mass) | 35 | 35 | 35 | 35 | 35 | 35 | 35 | 35 | 35 |
| Extrusion temperature (° C.) | 230 | 240 | 210 | 220 | 230 | 230 | 230 | 230 | 230 |
| Sheet forming temperature after extrusion (° C.) | 90 | 110 | 70 | 90 | 90 | 90 | 90 | 90 | 90 |
| PP blend (% by mass) | 10 | 0 | 5 | 8 | 10 | 10 | 10 | 10 | 10 |
| Original sheet membrane thickness (μm) | 2200 | 2000 | 2000 | 2000 | 2000 | 2000 | 2000 | 2000 | 2000 |
| Biaxial stretch ratio (times) | 7 × 7.5 | 7 × 7.5 | 7 × 7.5 | 7 × 7.5 | 7 × 7.5 | 7 × 7.5 | 7 × 7.5 | 7 × 7.5 | 7 × 7.5 |
| Biaxial stretching temperature (° C.) | 123 | 123 | 123 | 123 | 123 | 123 | 123 | 123 | 123 |
| HS stretching temperature (° C.) | 130 | 130 | 130 | 132 | 132 | 132 | 132 | 132 | 132 |
| HS stretch ratio (times) | 1.7 | 1.7 | 1.7 | 1.8 | 1.8 | 1.8 | 1.8 | 1.8 | 1.8 |
| HS relaxation rate (times) | 0.80 | 0.80 | 0.80 | 0.75 | 0.75 | 0.75 | 0.75 | 0.75 | 0.75 |
| MR aging | 60° C. · 24 h | 60° C. · 24 h | 60° C. · 12 h | 60° C. · 24 h | 60° C. · 24 h | 60° C. · 48 h | 60° C. · 24 h | 60° C. · 24 h | 60° C. · 24 h |
| Membrane thickness (μm) | 20 | 18 | 18 | 18 | 18 | 18 | 18 | 18 | 18 |
| Porosity (%) | 40 | 40 | 40 | 40 | 40 | 40 | 40 | 40 | 40 |
| Air permeability (sec) | 260 | 240 | 240 | 240 | 240 | 240 | 240 | 240 | 240 |
| Puncture strength (N) | 6.2 | 6.0 | 6.0 | 6.0 | 6.0 | 6.0 | 6.0 | 6.0 | 6.0 |
| Tensile strength MD (MPa) | 165 | 170 | 165 | 160 | 165 | 165 | 165 | 165 | 165 |
| Tensile strength TD (MPa) | 165 | 142 | 145 | 150 | 165 | 165 | 165 | 165 | 165 |
| Tensile strength ratio (MD/TD) | 1.00 | 1.20 | 1.14 | 1.07 | 1.00 | 1.00 | 1.00 | 1.00 | 1.00 |
| Tensile elongation (%) MD | 90 | 80 | 70 | 85 | 90 | 90 | 90 | 90 | 90 |
| Tensile elongation (%) TD | 110 | 150 | 130 | 120 | 110 | 110 | 110 | 110 | 110 |
| 105° C. Thermal shrinkage rate (%) | 2 | 2 | 2 | 1.5 | 1 | 0.1 | 1 | 1 | 1 |
| 120° C. Thermal shrinkage rate (%) | 3 | 3 | 3 | 2 | 1 | 0.1 | 1 | 1 | 1 |
| Content of aluminum in membrane (ppm) | 5 | 5 | 5 | 5 | 5 | 5 | 11 | 3 | 1 |
| Battery capacity (mAh) | 2580 | 2800 | 2810 | 2800 | 2790 | 2800 | 2820 | 2810 | 2810 |
| Resistance against foreign matters (A + B) (N) | 22 | 15 | 17 | 19 | 21 | 22 | 18 | 23 | 24 |
| Resistance against foreign matters (B) (N) | 22 | 13 | 15 | 17 | 22 | 24 | 19 | 24 | 26 |
| Capacity retention (%) | 90 | 90 | 92 | 93 | 94 | 97 | 95 | 96 | 97 |

TABLE 2

| | Example | | | | | | | | |
|---|---|---|---|---|---|---|---|---|---|
| | 1-10 | 1-11 | 1-12 | 1-13 | 1-14 | 1-15 | 1-16 | 1-17 | 1-18 |
| PC (% by mass) | 35 | 35 | 35 | 32 | 32 | 35 | 35 | 35 | 35 |
| Extrusion temperature (° C.) | 230 | 230 | 230 | 240 | 240 | 230 | 230 | 230 | 230 |
| Sheet forming temperature after extrusion (° C.) | 90 | 90 | 90 | 110 | 110 | 90 | 90 | 90 | 90 |
| PP blend (% by mass) | 10 | 10 | 10 | 12 | 12 | 10 | 10 | 10 | 10 |
| Original sheet membrane thickness (μm) | 2000 | 2000 | 2000 | 2000 | 2000 | 1600 | 1600 | 1600 | 1300 |
| Biaxial stretch ratio (times) | 7 × 7.5 | 7 × 7.5 | 7 × 7.5 | 7 × 7.5 | 7 × 7.5 | 7 × 7.5 | 7 × 7.5 | 7 × 7.5 | 7 × 7.5 |
| Biaxial stretching temperature (° C.) | 121 | 120 | 119 | 123 | 123 | 121 | 120 | 119 | 121 |
| HS stretching temperature (° C.) | 130 | 130 | 130 | 130 | 130 | 130 | 130 | 130 | 130 |
| HS stretch ratio (times) | 1.7 | 1.7 | 1.7 | 1.7 | 1.7 | 1.7 | 1.7 | 1.7 | 1.7 |
| HS relaxation rate (times) | 0.80 | 0.80 | 0.80 | 0.80 | 0.80 | 0.80 | 0.80 | 0.80 | 0.80 |
| MR aging | 60° C. · 24 h | 60° C. · 24 h | 60° C. · 24 h | 60° C. · 36 h | 60° C. · 48 h | 60° C. · 24 h | 60° C. · 36 h | 60° C. · 36 h | 60° C. · 24 h |
| Membrane thickness (μm) | 18 | 18 | 18 | 18 | 18 | 14 | 14 | 14 | 12 |
| Porosity (%) | 40 | 40 | 40 | 40 | 40 | 38 | 38 | 38 | 40 |

TABLE 2-continued

|  | Example | | | | | | | | |
| --- | --- | --- | --- | --- | --- | --- | --- | --- | --- |
|  | 1-10 | 1-11 | 1-12 | 1-13 | 1-14 | 1-15 | 1-16 | 1-17 | 1-18 |
| Air permeability (sec) | 240 | 240 | 240 | 240 | 240 | 290 | 290 | 290 | 240 |
| Puncture strength (N) | 6.3 | 6.7 | 7.0 | 6.0 | 6.0 | 5.2 | 5.6 | 6.0 | 4.4 |
| Tensile strength MD (MPa) | 175 | 200 | 240 | 155 | 155 | 200 | 220 | 240 | 200 |
| TD | 175 | 200 | 240 | 180 | 180 | 200 | 220 | 240 | 200 |
| Tensile strength ratio (MD/TD) | 1.00 | 1.00 | 1.00 | 0.86 | 0.86 | 1.00 | 1.00 | 1.00 | 1.00 |
| Tensile elongation (%) MD | 90 | 90 | 90 | 105 | 105 | 70 | 70 | 70 | 70 |
| TD | 110 | 110 | 110 | 90 | 90 | 90 | 90 | 90 | 90 |
| 105° C. Thermal shrinkage rate (%) | 1.5 | 2 | 2.5 | 2 | 0.1 | 2 | 2 | 2 | 2 |
| 120° C. Thermal shrinkage rate (%) | 3 | 5 | 9 | 5 | 0.1 | 6 | 4 | 4 | 6 |
| Content of aluminum in membrane (ppm) | 5 | 5 | 5 | 5 | 5 | 5 | 5 | 5 | 5 |
| Battery capacity (mAh) | 2820 | 2810 | 2830 | 2790 | 2790 | 2910 | 2900 | 2920 | 2990 |
| Resistance against foreign matters (A + B) (N) | 22 | 24 | 26 | 18 | 20 | 18 | 20 | 22 | 17 |
| Resistance against foreign matters (B) (N) | 23 | 25 | 28 | 24 | 26 | 20 | 21 | 23 | 19 |
| Capacity retention (%) | 93 | 92 | 91 | 91 | 94 | 89 | 90 | 90 | 89 |

TABLE 3

|  | Comparative Example | | | | |
| --- | --- | --- | --- | --- | --- |
|  | 1-1 | 1-2 | 1-3 | 1-4 | 1-5 |
| PC (% by mass) | 35 | 38 | 35 | 32 | 32 |
| Extrusion temperature (° C.) | 230 | 200 | 230 | 255 | 255 |
| Sheet forming temperature after extrusion (° C.) | 90 | 30 | 90 | 120 | 120 |
| PP blend (% by mass) | 10 | 0 | 10 | 14 | 14 |
| Original sheet membrane thickness (μm) | 2000 | 2000 | 2000 | 2000 | 2000 |
| Biaxial stretch ratio (times) | 7 × 7.5 | 7 × 7.5 | 7 × 7.5 | 7 × 8.5 | 7 × 8.5 |
| Biaxial stretching temperature (° C.) | 125 | 123 | 123 | 123 | 126 |
| HS stretching temperature (° C.) | 125 | 128 | 125 | 130 | 125 |
| HS stretch ratio (times) | 1.6 | 1.7 | 1.6 | 1.9 | 1.6 |
| HS relaxation rate (times) | 0.85 | 0.80 | 0.85 | 0.90 | 0.85 |
| MR aging | — | — | — | 60° C. · 36 h | — |
| Membrane thickness (μm) | 18 | 18 | 18 | 18 | 18 |
| Porosity (%) | 42 | 40 | 43 | 40 | 43 |
| Air permeability (sec) | 220 | 240 | 210 | 240 | 210 |
| Puncture strength (N) | 5.0 | 6.0 | 6.0 | 6.0 | 4.5 |
| Tensile strength (MPa) MD | 140 | 180 | 165 | 135 | 105 |
| TD | 140 | 140 | 165 | 185 | 145 |
| Tensile strength ratio (MD/TD) | 1.00 | 1.29 | 1.00 | 0.73 | 0.72 |
| Tensile elongation (%) MD | 100 | 70 | 90 | 110 | 115 |
| TD | 120 | 120 | 110 | 90 | 90 |
| 105° C. Thermal shrinkage rate (%) | 10 | 6 | 10 | 3 | 10 |
| 120° C. Thermal shrinkage rate (%) | 12 | 8 | 12 | 5 | 13 |
| Content of aluminum in membrane (ppm) | 5 | 5 | 5 | 5 | 5 |
| Battery capacity (mAh) | 2780 | 2790 | 2810 | 2800 | 2810 |
| Resistance against foreign matters (A + B) (N) | 10 | 12 | 14 | 13 | 8 |
| Resistance against foreign matters (B) (N) | 10 | 10 | 14 | 18 | 10 |
| Capacity retention (%) | 82 | 87 | 81 | 90 | 80 |

The respective characteristics in Examples 2-1 to 2-18 and Comparative Examples 2-1 to 2-3 were measured by the following methods.

(1) Weight Average Molecular Weight

Using an ALC/GPC 150 C type (trademark) made by Waters Corporation, standard polystyrene was measured on the following conditions to create a calibration curve.

Column: made by Tosoh Corporation, two $GMH_6$-HTs (trademark)+two $GMH_6$-HTLs (trademark)

Mobile phase: o-dichlorobenzene

Detector: differential refractometer

Flow rate: 1.0 mL/min.

Column temperature: 140° C.

Sample concentration: 0.1% by mass (Weight Average Molecular Weight of Polyethylene)

Each molecular weight component in the obtained calibration curve was multiplied by 0.43 (Q factor of polyethylene/Q factor of polystyrene=17.7/41.3) to obtain a molecular weight distribution curve in terms of polyethylene. Thus, the weight average molecular weight was calculated. With respect to polypropylene, multiplication by 0.63 was performed.

(2) Membrane thickness (μm)

The membrane thickness of the PO microporous membrane was measured at a room temperature of 23±2° C. using a micro thickness meter KBM (trademark) made by Toyo Seiki Seisaku-sho, Ltd.

(3) Porosity (%)

A 10 cm×10 cm square was cut out from the PO microporous membrane to obtain a sample, and the volume (cm$^3$) and mass (g) of the sample were determined. From the volume, the mass, and the membrane density (g/cm$^3$), the porosity of the PO microporous membrane was calculated by the following expression.

Porosity (%)=(volume−mass/membrane density)/volume×100

The membrane density was calculated and determined from the density and mixing ratio of the respective components that form the PO microporous membrane.

(4) Air Permeability (sec)

In accordance with JIS P-8117, the air permeability of the PO microporous membrane was measured by a Gurley type densometer (made by Toyo Seiki Seisaku-sho, Ltd., G-B2 (trademark)).

(5) Puncture Strength (N)

A KES-G5 (trademark), a handy-type compression tester made by Kato Tech Co., Ltd. was used. First, the microporous membrane was fixed by a sample holder. Next, a puncture test was performed on a central part of the fixed PO microporous membrane. The maximum puncture load at that time (N) was measured, and defined as puncture strength. Measurement conditions were as follows.

Diameter of an opening of the sample holder: 11.3 mm
Radius of curvature of a needle tip: 0.5 mm
Puncture rate: 2 mm/sec
Atmosphere temperature: 23±2° C.

(6) Tensile Strength (MPa), Tensile Elongation (%)

In accordance with JIS K7127, using a tension tester Autograph AG-A type (trademark) made by Shimadzu Corporation, the tensile strength and the tensile elongation were measured for the MD and the TD of the PO microporous membrane sample (shape; a rectangle measuring a width of 10 mm×a length of 100 mm). In this case, the distance between chucks was set at 50 mm. Measurement was performed in the state where a cellophane tape (made by Nitto Denko CS System Corporation, trade name "N. 29") was applied onto one surface at both ends (from the edge to 25 mm in each end) of the sample. In order to prevent slip of the sample during the test, a fluororubber having a thickness of 1 mm was applied to the inside of the chuck in the tension tester.

The tensile elongation (%) was determined by dividing the amount of elongation (mm) until the sample broke by the distance between the chucks (50 mm), and multiplying the divided value by 100. The tensile strength (MPa) was determined by dividing strength at the time of breakage of the sample by a cross-sectional area of the sample before the test.

The measurement conditions were set at a temperature of 23±2° C., a chuck pressure of 0.30 MPa, and a tensile rate of 200 mm/min.

(7) Measurement of Contents of Aluminum, Calcium, Magnesium, Zinc, and Barium

Approximately 0.2 g of a polyolefin raw material or a PO microporous membrane sample was weighed and placed in a sealed decomposition vessel made of a fluororesin. 5-mL high purity nitric acid was added there, and heated at 200° C. for 20 minutes by a microwave digestion system (made by Milestone Inc., trade name "ETHOS TC," 125571). Then, the volume was fixed at 50 mL with ultrapure water.

Subsequently, measurement was performed by an ICP mass spectrometer (made by Thermo Fisher Scientific K.K., trade name "X series X7 ICP-MS," X0126).

An internal standard method was used as a determination method, and determination was performed using a four-point calibration curve at concentrations of each element of 0 μg/L, 2 μg/L, 10 μg/L, and 20 μg/L. A test liquid for measurement was diluted so as to be within the range of the calibration curve. Cobalt (Co) was used as an internal standard element.

(8) Amount of Foreign Matters in PO Microporous Membrane

The number of foreign matters having a diameter of not less than 1 mm (those observed as a black spot when the film was observed with transmitted light) in a 25 cm×25 cm area of the obtained film was measured visually.

(9) Evaluation of Battery (Cycle Characteristics)

a. Preparation of Nonaqueous Electrolyte $LiPF_6$ as a solute was dissolved in a mixed solvent of ethylene carbonate:ethylmethyl carbonate=1:2 (volume ratio) such that the concentration was 1.0 mol/lit, to prepare a nonaqueous electrolyte.

b. Production of Negative Electrode 96.9% by mass of an artificial graphite as a negative electrode active substance, and 1.4% by mass of an ammonium salt of carboxymetyl cellulose and 1.7% by mass of a styrene-butadiene copolymer latex as a binder were dispersed in purified water to prepare a slurry. This slurry was applied to one surface of a copper foil having a thickness of 12 μm and serving as a negative electrode collector by a die coater, and dried at 120° C. for 3 minutes. Subsequently, the product was compression formed by a roll press machine. At this time, adjustment was made such that the amount of the negative electrode active substance to be applied was 106 g/m$^2$, and the bulk density of the active substance was 1.35 g/cm$^3$. The obtained formed article was slit at a width of 45.0 mm to obtain a band-like negative electrode.

c. Production of Positive Electrode 92.2% by mass of lithium cobalt complex oxide $LiCoO_2$ as a positive active substance, 2.3% by mass of flake graphite and 2.3% by mass of acetylene black as an electric conductive substance, and 3.2% by mass of polyvinylidene fluoride (PVDF) as a binder were dispersed in N-methylpyrrolidone (NMP) to prepare a slurry. This slurry was applied to one surface of an aluminum foil having a thickness of 20 μm and serving as a positive electrode collector by a die coater, and dried at 130° C. for 3 minutes. Subsequently, the product was compression formed by a roll press machine. At this time, adjustment was made such that the amount of the positive electrode active substance to be applied was 250 g/m$^2$, and the bulk density of the active substance was 3.00 g/cm$^3$. The obtained formed article was slit at a width of 44.0 mm to obtain a band-like positive electrode.

d. Assembly of Battery

The positive electrode, the separator described later, and the negative electrode were laminated in the order of the negative electrode, the separator, the positive electrode, and the separator, and spirally wound 12 times to produce an electrode plate laminated body. This electrode plate laminated body was pressed into a plate-like form for 30 seconds at 2 MPa under a temperature condition of 70° C. to obtain a battery wound body. Next, the produced battery wound body was inserted into a battery can made of aluminum. Subsequently, an aluminum lead led from the positive electrode was connected to a container wall, and a nickel lead led from the negative electrode was connected to a cover terminal portion of the battery can. Next, the nonaqueous electrolyte was injected into the battery can and sealed. The thus-produced lithium ion battery was 6.3 mm long (thick), 30 mm wide, and 48 mm high. The battery capacity of this battery was 600 mAh.

e. Evaluation of Cycle Characteristics

As initial charge and discharge of the battery assembled as d above, first, constant current charging was performed to the voltage of 4.2 V at a current value of ⅙ C, and initial charging for 8 hours in total was performed since reduction of the current value was started such that the constant voltage of 4.2 V was kept; next, discharging was performed to the end voltage of 2.5 V at a current of ⅙ C. Then, as cycle charging and discharging, a total of 500 cycles of charging and discharging was performed on cycle conditions: (i) the current amount of 0.5 C, the upper limit voltage of 4.2 V, constant current constant voltage charging for a total of 8 hours, (ii) a pause for 10 minutes, (iii) constant current discharging at a current amount of 0.5 C and an end voltage of 2.5 V, and (iv) a pause for 10 minutes. The charging and discharging processes were all performed under an atmosphere at 20° C. Subsequently, the ratio of the discharge capacity at the 500th cycle to the discharge capacity in the initial charging was multiplied by 100 to determine the capacity retention (%) serving as an evaluation index of the cycle characteristics.

(PE-1) to (PE-6) below were used as polyethylene, and (PP-1) below was used as polypropylene.

(PE-1) A homopolymer polyethylene having an Mw of 1,500,000 and the content of aluminum of 15 ppm. Obtained by washing a homopolymer polyethylene having an Mw of 1,500,000 and the content of aluminum of 30 ppm by 1 N of hydrochloric acid.

(PE-2) A homopolymer polyethylene having an Mw of 700,000 and the content of aluminum of 15 ppm. Obtained by washing a homopolymer polyethylene having an Mw of 700,000 and the content of aluminum of 30 ppm by 1 N of hydrochloric acid.

(PE-3) A homopolymer polyethylene having an Mw of 300,000 and the content of aluminum of 15 ppm. Obtained by washing a homopolymer polyethylene having an Mw of 300,000 and the content of aluminum of 30 ppm by 1 N of hydrochloric acid.

(PE-4) A homopolymer polyethylene having an Mw of 300,000 and the content of aluminum of 5 ppm.

(PE-5) A homopolymer polyethylene having an Mw of 300,000 and the content of aluminum of 1 ppm.

(PE-6) A homopolymer polyethylene having an Mw of 300,000 and the content of aluminum of 80 ppm.

(PP-1) A homopolymer polypropylene having an Mw of 300,000 and the content of aluminum of 1 ppm.

Example 2-1

70% by mass of polyethylene (PE-6) was added to 30% by mass of polyethylene (PE-5). Next, 4000 ppm (280 ppm as a calcium concentration) of calcium stearate was added as a lubricant based on the whole amount of polyethylene. 1% by mass of pentaerythrityl-tetrakis-[3-(3,5-di-t-butyl-4-hydroxyphenyl)propionate] was added as an antioxidant to the thus-obtained composition having an aluminum concentration of 60 ppm and a calcium concentration of 280 ppm, and was dry blended using a tumbler blender. Thus, a mixture of a polymer and the like was obtained. An atmosphere around the obtained mixture was replaced by nitrogen. Subsequently, the mixture was fed to a twin screw extruder by a feeder under the nitrogen atmosphere. Liquid paraffin (kinematic viscosity of $7.59 \times 10^{-5}$ m$^2$/s at 37.78° C.) was injected into a cylinder of the extruder by a plunger pump. The operating conditions on the feeder and the pump were adjusted such that the proportion of the liquid paraffin to the entire mixture to be extruded was 65% by mass, namely, a polymer concentration (hereinafter, abbreviated to "PC" in some cases) was 35% by mass.

Next, the mixture and the liquid paraffin were molten and kneaded within the twin screw extruder. The melting and kneading conditions were a temperature: 200° C., a screw rotation speed: 240 rpm, and an amount of discharge: 12 kg/h.

Then, the obtained molten and kneaded product was extruded through a T-die onto a cooling roller whose surface temperature was controlled at 25° C. The extruded product was contacted with the cooling roller, molded (casted), thereby to obtain a gel sheet having a membrane thickness of 1400 μm as an original sheet.

Next, the obtained gel sheet was guided to a simultaneous biaxial tenter stretching machine to obtain a stretched sheet by biaxial stretching. The stretching conditions set were an MD ratio of 7.0 times, a TD ratio of 7.0 times, i.e., an area ratio of 7×7=49 times, and a biaxial-stretching temperature of 125° C.

Next, the obtained stretched film was guided to a methyl ethyl ketone tank, and sufficiently immersed in methyl ethyl ketone to extract and remove liquid paraffin as the plasticizer, followed by drying and removal of methyl ethyl ketone.

Next, the stretched film was guided to a TD tenter in order to perform heat setting (hereinafter, abbreviated to "HS" in some cases). Then, HS was performed on the conditions of a heat setting temperature of 125° C., and a stretch ratio of 1.4 times, and the relaxation operation at a relaxation rate (HS relaxation rate) of 0.8 times was performed. Thus, a PO microporous membrane was obtained. With respect to the obtained PO microporous membrane, the respective characteristics were evaluated as mentioned above. Table 4 shows the results.

Examples 2-2 to 2-18, Comparative Examples 2-1 to 2-3

A PO microporous membrane was obtained in the same manner as that in Example 2-1 except that the respective conditions were changed as shown in Tables 4 to 6. In Examples 2-11, the film immediately after HS was further immersed in ethanol and washed by 1 N of hydrochloric acid, and then by water, and dried to obtain a PO microporous membrane. With respect to the obtained PO microporous membrane, the respective characteristics were evaluated as mentioned above. Tables 4 to 6 show the results.

TABLE 4

| | Example | | | | | | | | |
|---|---|---|---|---|---|---|---|---|---|
| | 2-1 | 2-2 | 2-3 | 2-4 | 2-5 | 2-6 | 2-7 | 2-8 | 2-9 |
| PE-1 (% by mass) | — | — | 70 | — | — | — | — | — | — |
| PE-2 (% by mass) | — | — | — | 100 | 50 | — | — | — | — |
| PE-3 (% by mass) | — | — | 30 | — | 50 | 100 | 100 | 100 | 100 |
| PE-4 (% by mass) | — | — | — | — | — | — | — | — | — |
| PE-5 (% by mass) | 30 | 60 | — | — | — | — | — | — | — |
| PE-6 (% by mass) | 70 | 40 | — | — | — | — | — | — | — |
| PP-1 (% by mass) | — | — | — | — | — | — | — | — | — |
| Metallic soap (ppm) | Calcium stearate 4000 | Calcium stearate 4000 | Calcium stearate 4000 | Calcium stearate 4000 | Calcium stearate 4000 | Calcium stearate 4000 | Barium stearate 500 | Barium stearate 260 | Magnesium stearate 250 |
| Original sheet membrane thickness (μm) | 1400 | 1400 | 1400 | 1400 | 1400 | 1400 | 1400 | 1400 | 1400 |
| Membrane thickness (μm) | 20 | 20 | 20 | 20 | 20 | 20 | 20 | 20 | 20 |
| Porosity (%) | 40 | 40 | 40 | 40 | 40 | 40 | 40 | 40 | 40 |
| Air permeability (sec) | 250 | 250 | 250 | 250 | 250 | 250 | 250 | 250 | 250 |
| Puncture strength (N) | 6 | 6 | 7 | 7 | 7 | 6 | 6 | 6 | 6 |
| Tensile strength (MPa) MD | 150 | 150 | 170 | 170 | 160 | 150 | 150 | 150 | 150 |
| Tensile strength (MPa) TD | 140 | 140 | 160 | 160 | 150 | 140 | 140 | 140 | 140 |
| Tensile elongation (%) MD | 85 | 85 | 100 | 100 | 90 | 85 | 85 | 85 | 85 |
| Tensile elongation (%) TD | 125 | 125 | 140 | 140 | 130 | 125 | 125 | 125 | 125 |
| Content of aluminum in membrane (ppm) | 60 | 32 | 15 | 15 | 15 | 15 | 15 | 15 | 15 |
| Total content of Ca, Mg, Zn, and Ba in membrane (ppm) | 280 | 280 | 280 | 280 | 280 | 280 | 100 | 50 | 10 |
| Amount of foreign matters in PO microporous membrane (pieces/25 cm × 25 cm) | 20 | 12 | 12 | 9 | 6 | 3 | 3 | 3 | 3 |
| Cycle characteristics | 86 | 88 | 88 | 88 | 88 | 88 | 91 | 93 | 95 |

TABLE 5

| | Example | | | | | | | | |
|---|---|---|---|---|---|---|---|---|---|
| | 2-10 | 2-11 | 2-12 | 2-13 | 2-14 | 2-15 | 2-16 | 2-17 | 2-18 |
| PE-1 (% by mass) | — | — | — | — | — | — | — | — | — |
| PE-2 (% by mass) | — | — | — | — | — | — | — | — | — |
| PE-3 (% by mass) | 50 | 50 | — | — | — | — | — | — | — |
| PE-4 (% by mass) | 50 | 50 | 100 | — | — | — | — | — | — |
| PE-5 (% by mass) | — | — | — | 100 | 100 | 100 | 95 | 95 | 95 |
| PE-6 (% by mass) | — | — | — | — | — | — | — | — | — |
| PP-1 (% by mass) | — | — | — | — | — | — | 5 | 5 | 5 |
| Metallic soap (ppm) | Magnesium stearate 250 | Magnesium stearate 250 | Magnesium stearate 250 | Zinc stearate 100 | Zinc stearate 10 | Zinc stearate 2800 | Zinc stearate 2800 | Zinc stearate 2800 | Zinc stearate 2800 |
| Original sheet membrane thickness (μm) | 1400 | 1400 | 1400 | 1400 | 1400 | 1400 | 1400 | 700 | 350 |
| Membrane thickness (μm) | 20 | 20 | 20 | 20 | 20 | 20 | 20 | 10 | 5 |
| Porosity (%) | 40 | 40 | 40 | 40 | 40 | 40 | 40 | 40 | 40 |
| Air permeability (sec) | 250 | 250 | 250 | 250 | 250 | 250 | 250 | 130 | 80 |
| Puncture strength (N) | 6 | 6 | 6 | 6 | 6 | 6 | 6 | 4 | 3 |
| Tensile strength (MPa) MD | 150 | 150 | 150 | 150 | 150 | 150 | 150 | 170 | 180 |
| Tensile strength (MPa) TD | 140 | 140 | 140 | 140 | 140 | 140 | 140 | 150 | 160 |
| Tensile elongation (%) MD | 85 | 85 | 85 | 85 | 85 | 85 | 85 | 80 | 70 |
| Tensile elongation (%) TD | 125 | 125 | 125 | 125 | 125 | 125 | 125 | 120 | 110 |
| Content of aluminum in membrane (ppm) | 10 | 1 | 5 | 1 | 1 | 1 | 1 | 1 | 1 |
| Total content of Ca, Mg, Zn, and Ba in membrane (ppm) | 10 | 1 | 10 | 10 | 1 | 280 | 280 | 280 | 280 |
| Amount of foreign matters in PO microporous membrane (pieces/25 cm × 25 cm) | 2 | 0 | 1 | 0 | 0 | 0 | 0 | 0 | 0 |
| Cycle characteristics | 95 | 98 | 95 | 96 | 98 | 89 | 89 | 89 | 89 |

TABLE 6

|  |  | Comparative Example | | |
|---|---|---|---|---|
|  |  | 2-1 | 2-2 | 2-3 |
| PE-1 (% by mass) |  | — | — | — |
| PE-2 (% by mass) |  | — | — | — |
| PE-3 (% by mass) |  | — | — | — |
| PE-4 (% by mass) |  | — | — | — |
| PE-5 (% by mass) |  | — | — | — |
| PE-6 (% by mass) |  | 100 | 100 | 100 |
| PP-1 (% by mass) |  | — | — | — |
| Metallic soap (ppm) |  | Calcium stearate 5700 | Calcium stearate 4000 | Calcium stearate 710 |
| Original sheet membrane thickness (μm) |  | 1400 | 1400 | 1400 |
| Membrane thickness (μm) |  | 20 | 20 | 20 |
| Porosity (%) |  | 40 | 40 | 40 |
| Air permeability (sec) |  | 250 | 250 | 250 |
| Puncture strength (N) |  | 6 | 6 | 6 |
| Tensile strength (MPa) | MD | 150 | 150 | 150 |
|  | TD | 140 | 140 | 140 |
| Tensile elongation (%) | MD | 85 | 85 | 85 |
|  | TD | 125 | 125 | 125 |
| Content of aluminum in membrane (ppm) |  | 80 | 80 | 80 |
| Total content of Ca, Mg, Zn, and Ba in membrane (ppm) |  | 400 | 280 | 50 |
| Amount of foreign matters in PO microporous membrane (pieces/25 cm × 25 cm) |  | 35 | 33 | 37 |
| Cycle characteristics |  | 75 | 83 | 90 |

The present application is based on Japanese Patent Application No. 2008-324259, filed on Dec. 19, 2008 to Japan Patent Office, the subject of which is incorporated herein by reference.

INDUSTRIAL APPLICABILITY

The PO microporous membrane according to the present invention is particularly suitably used as a separator for high capacity lithium ion batteries.

The PO microporous membrane according to the present invention is high quality, and particularly has industrial applicability to a separator for lithium ion secondary batteries showing favorable cycle characteristics.

The invention claimed is:

1. A polyolefin microporous membrane having a ratio of tensile strength in a length direction to tensile strength in a width direction of 0.75 to 1.25, and a thermal shrinkage rate in the width direction at 105° C. of less than 1%,
wherein the polyolefin comprises not less than 30% by mass of polyethylene, and wherein the tensile strength in the width direction is not less than 160 MPa.

2. The polyolefin microporous membrane according to claim 1, wherein the polyolefin microporous membrane has the ratio of tensile strength of 0.85 to 1.25.

3. The polyolefin microporous membrane according to claim 1, wherein the polyolefin microporous membrane has the tensile strength of not less than 160 MPa and not more than 250 MPa.

4. The polyolefin microporous membrane according to claim 1, wherein the polyolefin microporous membrane has a content of aluminum of not more than 10 ppm.

5. A separator for a lithium on secondary battery, comprising the polyolefin microporous membrane according to any one of claims 1, 2, 3 and 4.

6. A lithium on secondary battery comprising the separator for a lithium on secondary battery according to claim 5, a positive electrode, a negative electrode, and an electrolytic solution.

* * * * *

UNITED STATES PATENT AND TRADEMARK OFFICE
CERTIFICATE OF CORRECTION

PATENT NO. : 9,620,754 B2
APPLICATION NO. : 13/140778
DATED : April 11, 2017
INVENTOR(S) : Daisuke Inagake et al.

Page 1 of 1

It is certified that error appears in the above-identified patent and that said Letters Patent is hereby corrected as shown below:

In the Claims

In Claim 5, Column 34, Line 27:
"lithium on secondary battery," should read --lithium ion secondary battery,--.

In Claim 6, Column 34, Line 30:
"lithium on secondary battery" should read --lithium ion secondary battery--.

In Claim 6, Column 34, Line 31:
"lithium on secondary battery" should read --lithium ion secondary battery--.

Signed and Sealed this
Seventeenth Day of April, 2018

Andrei Iancu
*Director of the United States Patent and Trademark Office*